United States Patent
Yasumoto et al.

(10) Patent No.: US 9,614,422 B2
(45) Date of Patent: Apr. 4, 2017

(54) ELECTRIC MOTOR APPARATUS AND METHOD FOR ASSEMBLING THE SAME

(71) Applicant: Mitsuba Corporation, Kiryu-shi, Gunma (JP)

(72) Inventors: Kenji Yasumoto, Kiryu (JP); Teppei Tokizaki, Kiryu (JP); Shigeki Ota, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 334 days.

(21) Appl. No.: 14/355,854

(22) PCT Filed: Oct. 31, 2012

(86) PCT No.: PCT/JP2012/078168
§ 371 (c)(1),
(2) Date: May 2, 2014

(87) PCT Pub. No.: WO2013/065736
PCT Pub. Date: May 10, 2013

(65) Prior Publication Data
US 2014/0252897 A1    Sep. 11, 2014

(30) Foreign Application Priority Data

Nov. 4, 2011    (JP) ................................ 2011-242101

(51) Int. Cl.
H02K 5/14    (2006.01)
H02K 5/22    (2006.01)
(Continued)

(52) U.S. Cl.
CPC ............ *H02K 13/00* (2013.01); *H02K 5/148* (2013.01); *H02K 5/225* (2013.01);
(Continued)

(58) Field of Classification Search
CPC ............................. H02K 7/081; H02K 7/1166
(Continued)

(56) References Cited

U.S. PATENT DOCUMENTS 5,656,878 A * 8/1997 Nakata ................... H02K 5/225
                                                  310/67 R
6,903,473 B2 * 6/2005 Matsuyama ............ G01P 1/026
                                                  310/71
(Continued)

FOREIGN PATENT DOCUMENTS

| DE | WO 2011003649 A1 * | 1/2011 | ........... H02K 11/026 |
|----|--------------------|--------|-------------------------|
| JP | 10-157574 A | 6/1998 | |
| JP | 10-225048 A | 8/1998 | |
| JP | 2008-199695 A | 8/2008 | |
| JP | 2008-236995 A | 10/2008 | |
| JP | 2010-154660 A | 7/2010 | |
| WO | 01/61828 A1 | 8/2001 | |

OTHER PUBLICATIONS

International Seach Report for PCT Serial No. PCT/JP2012/078168 dated Dec. 25, 2012.
(Continued)

*Primary Examiner* — Quyen Leung
*Assistant Examiner* — Eric Johnson
(74) *Attorney, Agent, or Firm* — McCormick, Paulding & Huber LLP

(57) ABSTRACT

In an electric motor apparatus including an electric motor (13), a speed-reduction mechanism (14) which transmits motive power of the electric motor (13), a housing (15) which accommodates the speed-reduction mechanism (14) and the electric motor (13), and a yoke (16a) fixed to an outer portion of the housing (15), the housing (15) is provided with a concave portion (21), a holding hole (18a), and an accommodation chamber (15a). A connector unit (25) is moved along the first direction and installed to a concave portion (21). A brush holder (26) is moved along the second direction and installed to the holding hole (18a). The speed-reduction mechanism (14) is moved along the first
(Continued)

direction and accommodated in the accommodation chamber (15a). The yoke (16a) is moved along the second direction and fixed to the housing (15). Therefore, no restriction is imposed on the routing of an external connector connected to the connector unit (25).

6 Claims, 23 Drawing Sheets

(51) Int. Cl.
    *H02K 7/116*     (2006.01)
    *H02K 13/00*     (2006.01)
    *H02K 15/14*     (2006.01)

(52) U.S. Cl.
    CPC ........... *H02K 7/1166* (2013.01); *H02K 15/14* (2013.01); *Y10T 29/49011* (2015.01)

(58) Field of Classification Search
    USPC .......................................................... 310/71
    See application file for complete search history.

(56) References Cited

U.S. PATENT DOCUMENTS

| | | |
|---|---|---|
| 2003/0137202 A1 | 7/2003 | Mao et al. |
| 2003/0178908 A1 | 9/2003 | Hirano et al. |
| 2004/0066111 A1 | 4/2004 | Torii |
| 2008/0284272 A1 | 11/2008 | Honda et al. |
| 2011/0221291 A1* | 9/2011 | Mili .................... F16H 1/16 310/77 |
| 2012/0139371 A1* | 6/2012 | Gottschalk ........... H02K 11/026 310/71 |

OTHER PUBLICATIONS

Supplemental European Search Report for European Patent Application No. EP 12844723 dated Oct. 5, 2015.

* cited by examiner

ELECTRIC MOTOR APPARATUS AND METHOD FOR ASSEMBLING THE SAME

CROSS-REFERENCE TO RELATED APPLICATION

This application is entitled to the benefit of and incorporates by reference subject matter disclosed in International Patent Application No. PCT/JP2012/078168 filed on Oct. 31, 2012 and Japanese Patent Application No. JP2011-242101 filed on Nov. 4, 2011.

TECHNICAL FIELD

The present invention relates to an electric motor apparatus unitized by installing, to a housing, an electric motor which is driven by power supplied thereto and a motive-power transmission mechanism coupled to the electric motor and a method of assembling the apparatus.

BACKGROUND ART

Conventionally, a vehicle is equipped with vehicle-installed electric equipment such as a windshield wiper unit, a power window unit, and a power slide door unit. The vehicle-installed electric equipment is provided with an electric motor as a motive power source and is configured such that the motive power of the electric motor actuates actuation members such as a wiper arm, door glass, door, etc. A speed-reduction mechanism (motive-power transmission mechanism) is provided on a route for transmitting the motive power of the electric motor. The speed-reduction mechanism is accommodated in a hollow housing for the purpose of, for example, preventing foreign substances from entering between elements forming the speed-reduction mechanism. A yoke accommodating the electric motor is installed to the exterior of the housing, and the output shaft of the electric motor is inserted into the housing.

Japanese Patent Application Laid-Open Publication No. 2008-236995 discloses an example of an electric motor apparatus having such an arrangement. The motor apparatus disclosed in Japanese Patent Application Laid-Open Publication No. 2008-236995 is used for a wiper motor. The wiper motor includes a motor subassembly (electric motor) forming the motor apparatus and a speed-reduction portion assembly. The motor subassembly includes a yoke having a bottomed shape, an armature accommodated in the yoke, an armature shaft which rotates together with the armature, a commutator provided on the armature shaft, and a brush holder unit which supplies power to the armature via the commutator. A first flange portion is formed on the yoke so as to extend from the opening end to the outer circumference side. The brush holder unit includes a brush holder, a pair of brushes, and internal wirings as main components.

The brush holder forming the brush holder unit includes a cylindrical holder main body portion and a second flange portion extending outward in the radial direction from the holder main body portion. In addition, the brush holder includes a flat plate portion extending from the second flange portion in the widthwise direction and a connector box (connector unit) formed on the distal end side of the flat plate portion. The respective portions of the brush holder are integrally formed by injection molding using a resin material. Furthermore, an external connector is detachably connected to the connector box to electrically connect the internal wirings to an external power source, operation switches, and the like.

On the other hand, the speed-reduction portion assembly includes a gear housing (housing). The third flange portion is integrally formed on the gear housing so as to extend from an end portion on the yoke side to the outer circumference side. The third flange portion abuts on an end face of the first flange portion, with the second flange portion being sandwiched between them, and is fastened/fixed to the first flange portion with a plurality of screws. This makes the direction along the axis of the armature coincide with the assembling direction of the brush holder unit with respect to the yoke and the assembling direction of the speed-reduction portion assembly with respect to the brush holder unit.

The speed-reduction portion assembly is placed in the gear housing. The gear housing has an opening portion on the bottom surface side. A cover member closes the opening portion. The speed-reduction portion assembly includes a worm as the first gear and a worm wheel as the second gear which form a speed-reduction mechanism (motive-power transmission mechanism). The worm is coaxially disposed with the armature shaft and is coupled to the armature shaft through a coupling so as to transmit torque to it while a motor assembly is being coupled to the speed-reduction portion assembly.

On the other hand, the rear wiper motor (electric motor apparatus) disclosed in Japanese Patent Application Laid-Open Publication No. 2008-199695 is installed to each back door of a vehicle through a metal bracket. This rear wiper motor is formed by an armature which rotates by energization, a flat cylindrical yoke accommodating the armature, and a gear case coupled to the yoke and having a wiper shaft which has a thread portion formed on the distal end of a pivot shaft which rotates through a speed-reduction mechanism, with the wiper shaft extending outward. A plurality of fastening portions are formed around the gear case in the shape of thick flanges. While the bracket is covering the opening of the gear case, the plurality of fastening portions are fastened/fixed to the bracket with screws. Japanese Patent Application Laid-Open Publication No. 2008-199695 has no description about how components such as a connector forming part of a circuit which supplies power to the rear wiper motor are provided in the gear case.

SUMMARY OF THE INVENTION

In the motor apparatus disclosed in Japanese Patent Application Laid-Open Publication No. 2008-236995, however, the brush holder including the connector box is integrally formed by injection molding using a resin material. For this reason, while the gear housing and the yoke are being fixed with the brush holder being sandwiched between them, the disposition position of the connector box in the overall motor apparatus is uniquely determined based on the disposition position of the brush holder. Consequently, in a vehicle to which the motor apparatus is to be installed, restrictions are imposed on the routing of an external connector.

It is an object of the present invention to provide an electric motor apparatus free from restrictions on the routing of an external connector connected to a connector unit in a target on which the electric motor apparatus is to be installed, and a method of assembling the apparatus.

An electric motor apparatus of the present invention includes an electric motor which is driven by power supplied thereto, a motive-power transmission mechanism to which motive power is transmitted from the electric motor, and a housing for accommodating the motive-power transmission mechanism and part of the electric motor, the electric motor including an armature shaft which is disposed across an outer portion of the housing and an inner portion of the housing, an armature shaft which is rotatable about an axis, a coil for feeding installed to a portion of the armature shaft which is located outside the housing, a commutator which is installed to the armature shaft and switches a current flowing in the coil, and a cylindrical yoke which is fixed to an outer portion of the housing and accommodates a portion of the electric motor which is located outside the housing, and a brush holder holding a power supply brush which comes into contact with the commutator and a connector unit which is conductively connected to the brush and on which an external connector is detachably installed being installed to the housing, wherein the housing includes a concave portion having a first opening portion opened in a plane parallel to the axis, a second opening portion opened in a plane perpendicular to the axis, a holding hole extending through the housing in a direction along the axis, a third opening portion opened parallel to the first opening portion, and an accommodation chamber communicating with the holding hole, and the connector unit is installed to the concave portion through the first opening portion and the brush holder is installed to the holding hole through the second opening portion so that the brush and the connector unit are connected to be power-feedable, a portion of the armature shaft which is accommodated inside the housing is accommodated in the accommodation portion through the holding hole, the motive-power transmission mechanism is accommodated in the accommodation chamber through the third opening portion, and the yoke being fixed to the housing so as to cover the second opening portion.

In the electric motor apparatus according to the present invention, the motive-power transmission mechanism includes a worm provided on the armature shaft and a worm wheel which meshes with the worm and is configured to rotate about a support shaft, and the motive-power transmission mechanism is a speed-reduction mechanism configured such that, upon transmitting motive power from the armature shaft to the worm wheel, the number of revolutions of the worm wheel becomes smaller than the number of revolutions of the armature shaft.

In the electric motor apparatus according to the present invention, the brush holder is provided with a first terminal conductively connected to the brush, the connector unit is provided with a second terminal connected to the external connector, and the first terminal and the second terminal are connected inside the holding hole while the connector unit is being installed to the concave portion and the brush holder is being installed to the holding hole.

In the electric motor apparatus according to the present invention, the concave portion is provided so as to be closer to the yoke than the support shaft in a direction along the axis.

The electric motor apparatus according to the present invention, the brush holder held in the holding hole is sandwiched and fixed between the housing and the yoke, a lid member sealing the first opening portion is provided, and a connector unit installed to the concave portion is sandwiched and fixed between the housing and the lid member.

A method of assembling an electric motor apparatus according to the present invention including preparing an electric motor that includes an armature shaft around which a coil for feeding is wound and to which a commutator for switching a current flowing in the coil is installed and a cylindrical yoke, preparing a brush holder to which a brush for energizing the commutator is installed, a connector unit which is connected to the brush to be power-feedable to the brush and to which an external connector is detachably installed, a motive-power transmission mechanism to which motive power of the armature shaft is transmitted, and a housing including an accommodation chamber in which the motive-power transmission mechanism and part of the armature shaft are accommodated, and accommodating the motive-power transmission mechanism inside the housing by inserting part of the armature shaft into the housing while the connector unit and the brush holder are positioned with respect to the housing, and fixing the yoke in the housing while a portion of the armature shaft disposed outside the housing and the coil inside the yoke are being accommodated inside the yoke, the method including: a first step of mounting the connector unit in a concave portion through a first opening portion provided in the housing by moving the connector unit along a first direction; a second step of installing the brush holder in a holding hole provided in the housing by moving the brush holder along a second direction at a right angle to the first direction so that the connector unit and the brush are connected to be power-feedable; a third step of disposing part of the armature shaft in the accommodation chamber through the holding hole and bringing the commutator into contact with the brush by moving the armature shaft along the second direction; a fourth step of disposing the motive-power transmission mechanism in the accommodation chamber by moving the motive-power transmission mechanism along the first direction; and a fifth step of fixing the yoke in the housing, while the commutator and the coil are being accommodated in the yoke, by moving the yoke along the second direction.

According to the present invention, the connector unit installed to the concave portion of the housing and the brush holder installed to the holding hole of the housing are separately formed. That is, it is possible to decide the disposition position of the connector unit in the electric motor apparatus independently of the disposition position of the brush holder. Therefore, the routing of an external connector connected to the connector unit does not easily suffer from restrictions in a target on which the electric motor apparatus is to be installed.

According to the present invention, when motive power is transmitted from the armature shaft to the worm wheel, the number of revolutions of the worm wheel becomes smaller than that of the armature shaft. This can increase torque.

According to the present invention, it is possible to connect the first and second terminals to each other in the holding hole by mounting the connector unit in the concave portion and installing the brush holder in the holding hole.

According to the present invention, it is possible to provide a concave portion by using the space between the support shaft and the yoke in a direction along the axis.

According to the present invention, since the lid member has both the function of closing the first opening portion and the function of fixing the connector unit to the housing, there is no need to provide any dedicated fixing member for fixing the connector unit.

According to the present invention, when assembling the electric motor apparatus, it is possible to mount the connector unit in the concave portion by moving the connector unit in a direction at a right angle to the axis and accommodate the motive-power transmission mechanism in the accommodation chamber by moving the mechanism in a direction at a right angle to the axis. On the other hand, it is possible to dispose part of the armature shaft in the accommodation chamber by inserting the brush holder into the holding hole upon moving the holder in a direction along the axis and also moving the armature shaft along the axis. Therefore, components are moved in two directions with respect to the housing. This improves the assembly efficiency of the electric motor apparatus. When assembling the electric motor apparatus by using an automated machine, it is possible to assemble the electric motor apparatus without inverting the housing. This facilitates the construction of an assembly line.

BRIEF DESCRIPTIONS OF THE DRAWINGS

DETAILED DESCRIPTION

An electric motor apparatus of the present invention can be used as a motive power source for an apparatus including actuation members such as a wiper unit for a vehicle, a power window unit, or a power slide door unit. An embodiment using the electric motor apparatus of the present invention as a motive power source for actuating a wiper arm as an actuation member of a wiper apparatus will be described in detail with reference to the accompanying drawings.

(First Embodiment)

Figure 1:
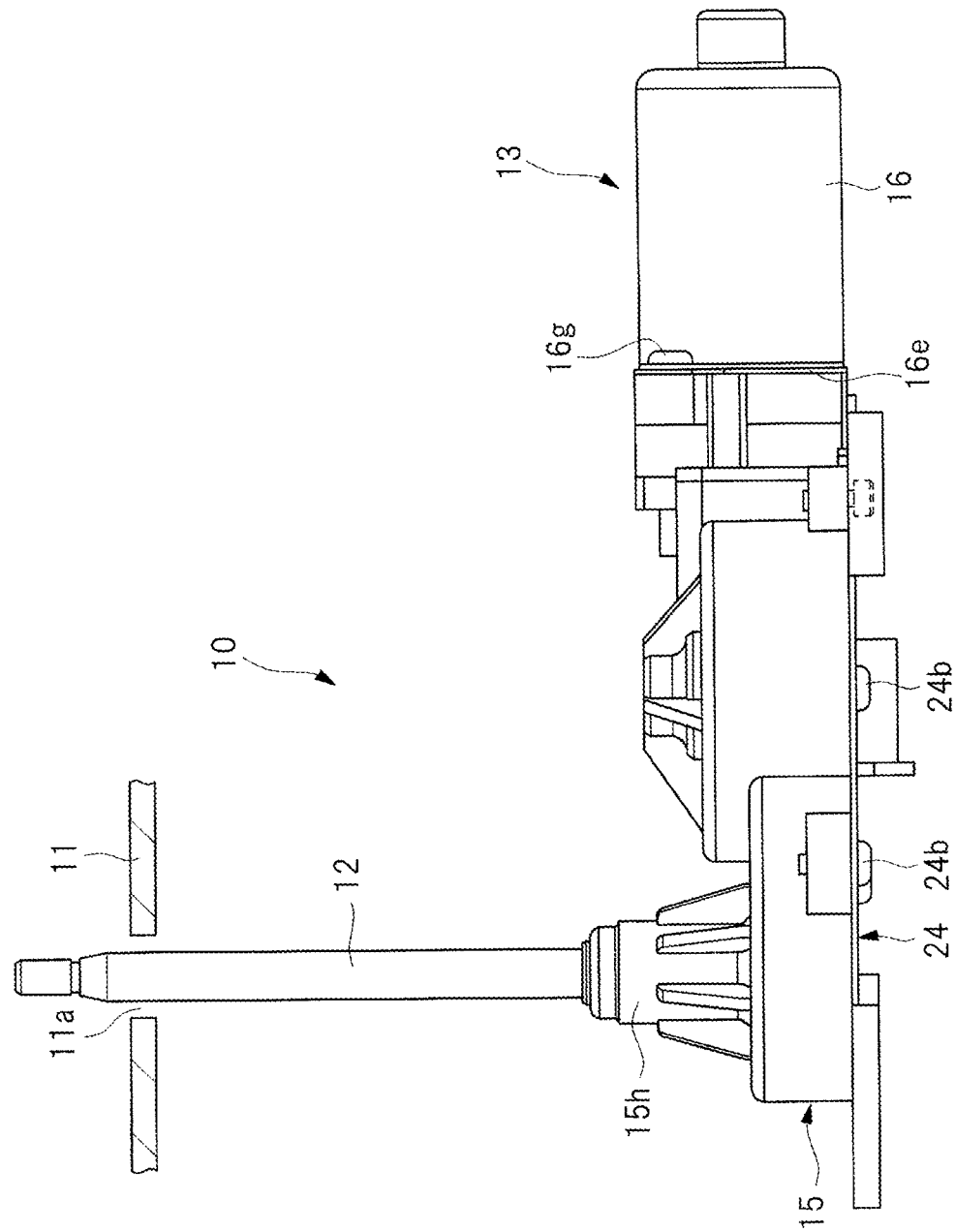
FIG. 1 is a front view showing an example of a state in which an electric motor apparatus of the present invention is being installed to a vehicle.
Figure 2:
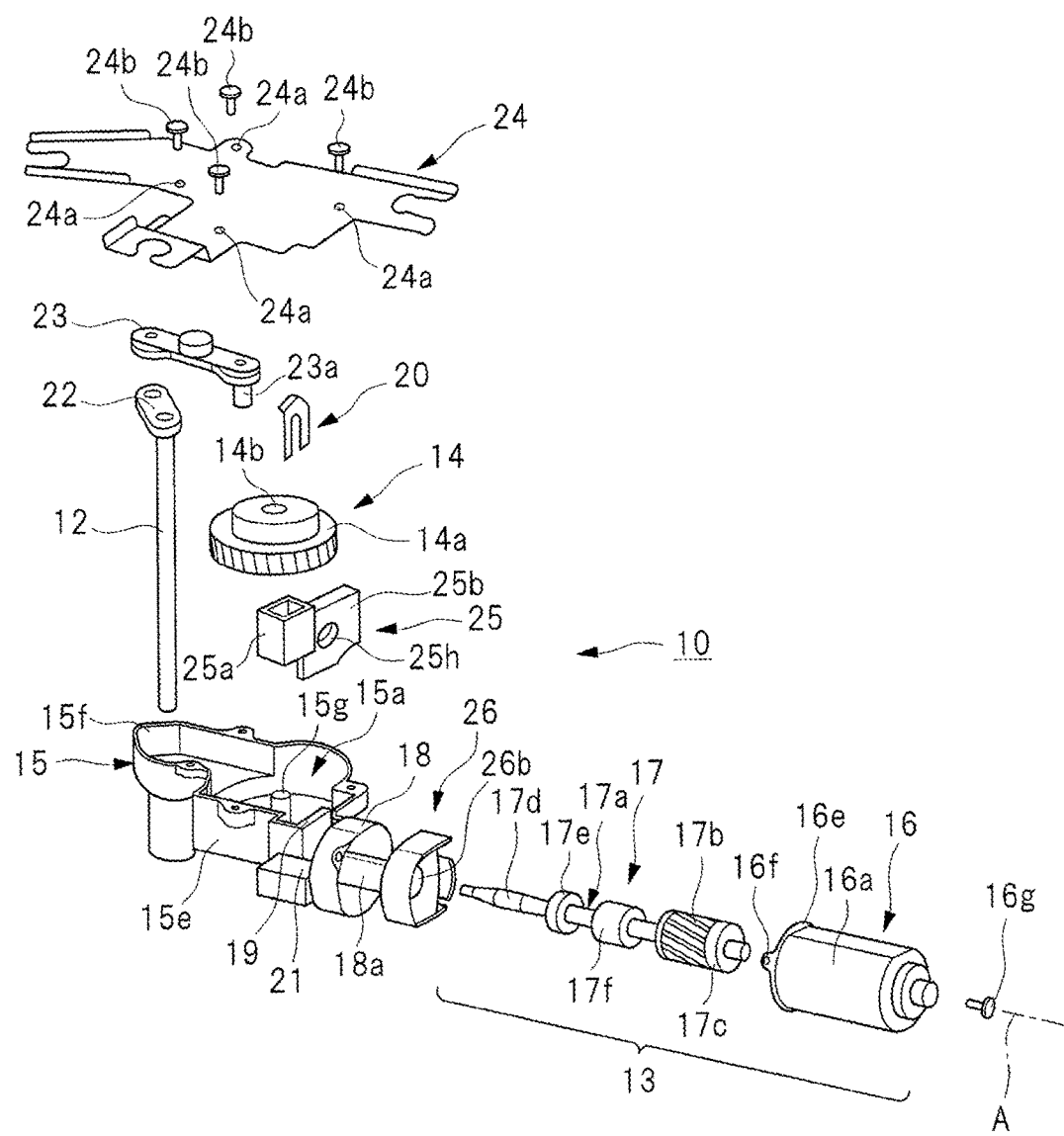
FIG. 2 is an exploded perspective view schematically showing respective components of the electric motor apparatus of the present invention in an exploded state.
Figure 3:
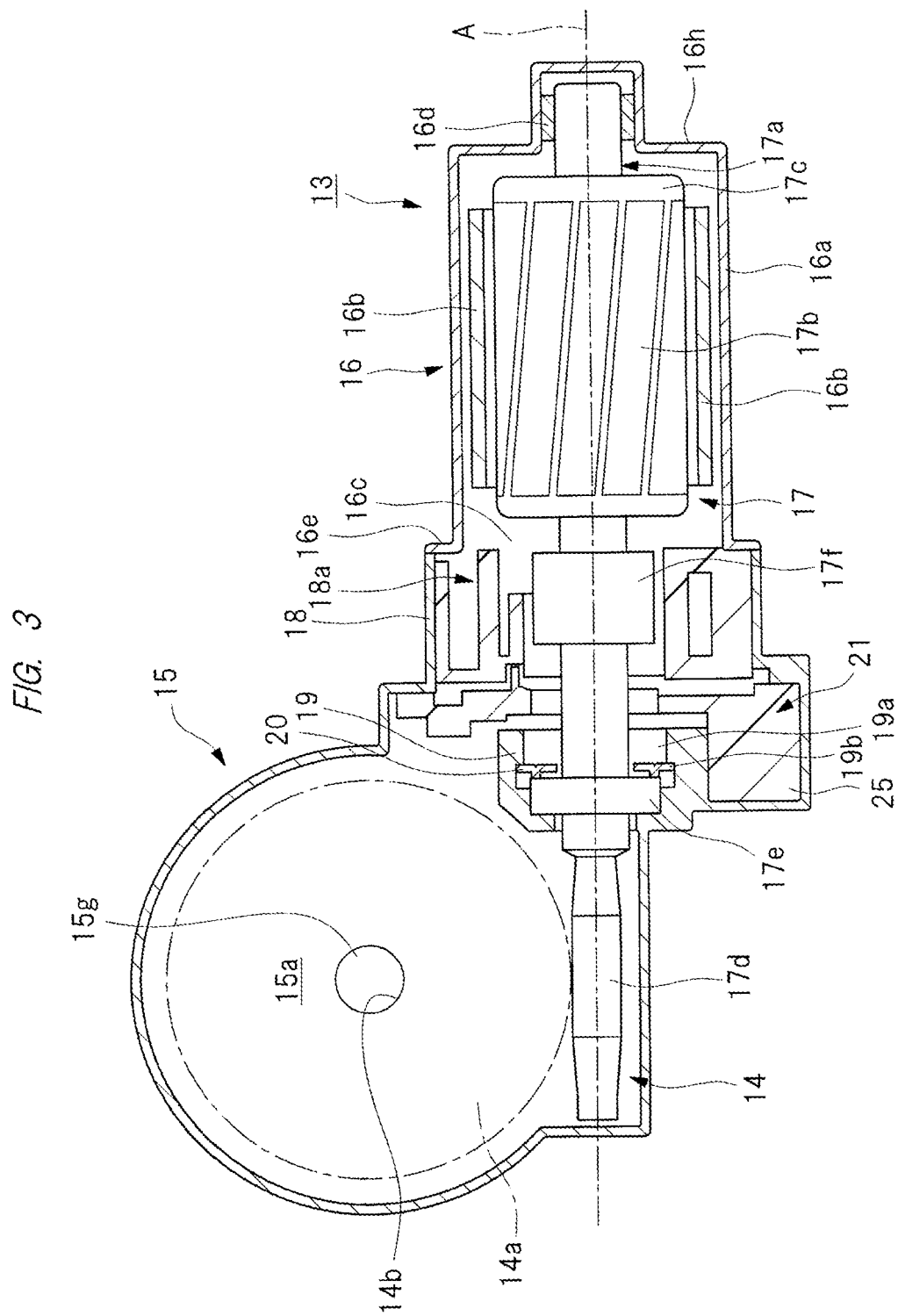
FIG. 3 is a cross-sectional view of the electric motor apparatus of the present invention.

As shown in FIG. 1, an electric motor apparatus 10 is provided below a panel 11 forming part of a vehicle. More specifically, the electric motor apparatus 10 is installed while the distal end of a pivot shaft 12 to which a wiper arm (not shown) is coupled faces upward and the pivot shaft 12 is inserted into a shaft hole 11a of the panel 11. As shown in FIGS. 2 and 3, the electric motor apparatus 10 includes an electric motor 13 which generates motive power upon receiving power and a speed-reduction mechanism 14 provided on a route for transmitting the motive power of the electric motor 13 to the pivot shaft 12. The speed-reduction mechanism 14 is accommodated in a hollow housing 15. The electric motor 13 is mainly disposed outside the housing 15.

The arrangement of the electric motor 13 will be described first. As shown in FIGS. 2 and 3, the electric motor 13 includes a stator assembly 16 and a rotor (armature) assembly 17. The stator assembly 16 includes a cylindrical yoke 16a and a plurality of permanent magnets 16b fixed to the inner circumference of the yoke 16a. The yoke 16a is made of a metal material such as iron. A bottom portion 16h is formed at one end of the yoke 16a in a direction along an axis A. An opening portion 16c is formed at the other end of the yoke 16a. The bottom portion 16h supports the outer ring of a bearing 16d. A flange portion 16e is formed on the outer circumference of the end portion of the yoke 16a which is located on the opening portion 16c side so as to protrude outward in the radial direction of the yoke 16a. A hole 16f is provided in the flange portion 16e so as to penetrate through the flange portion 16e in a direction along the axis A.

On the other hand, the rotor assembly 17 includes an armature shaft 17a, an armature core 17b which rotates together with the armature shaft 17a, and a coil 17c formed by winding an electric wire around the armature core 17b. Almost a half of the armature shaft 17a in the longitudinal direction is disposed inside the yoke 16a, and almost the remaining half in the longitudinal direction is disposed inside the housing 15. In addition, the armature core 17b is disposed inside the plurality of permanent magnets 16b. That is, while the yoke 16a is fixed to the housing 15, the armature core 17b is located inside the yoke 16a. In addition, a worm (screw gear) 17d is formed on a portion of the armature shaft 17a which is disposed inside the housing 15. Furthermore, a bearing 17e supports a portion, of the portion of the armature shaft 17a which is disposed inside the housing 15, which corresponds to between the armature core 17b and the worm 17d. The inner ring (not shown) of the bearing 17e is fitted and fixed on the outer circumference of the armature shaft 17a. A commutator 17f is installed between the bearing 17e and the armature core 17b of the commutator 17f.

The arrangement of the housing 15 will be described next with reference to FIGS. 2 to 5. The housing 15 is formed from a conductive metal material, for example, an aluminum alloy. The housing 15 is an element accommodating the entire speed-reduction mechanism 14 and part of the electric motor 13. The housing 15 includes an accommodation chamber 15a accommodating the speed-reduction mechanism 14. The accommodation chamber 15a is a space surrounded by two bottom portions 15c and 15d continuously formed through a step portion 15b, and a sidewall 15e formed around the bottom portions 15c and 15d. An opening portion 15f is formed between the accommodation chamber 15a and an outer portion of the housing 15. The opening portion 15f opens in a plane (not shown) parallel to the axis A. A support shaft 15g is provided on the bottom portion 15c. The support shaft 15g is provided to rotatably support a worm wheel (to be described later). The support shaft 15g is provided along a direction perpendicular to a plane as a reference for the formation of the opening portion 15f of the housing 15. A sleeve 15h is provided continuously with the bottom portion 15d. A shaft hole 15i is formed in the sleeve 15h. The center line (not shown) of the shaft hole 15i is parallel to the center line (not shown) of the support shaft 15g. The pivot shaft 12 is rotatably inserted into the shaft hole 15i.

Figure 4:
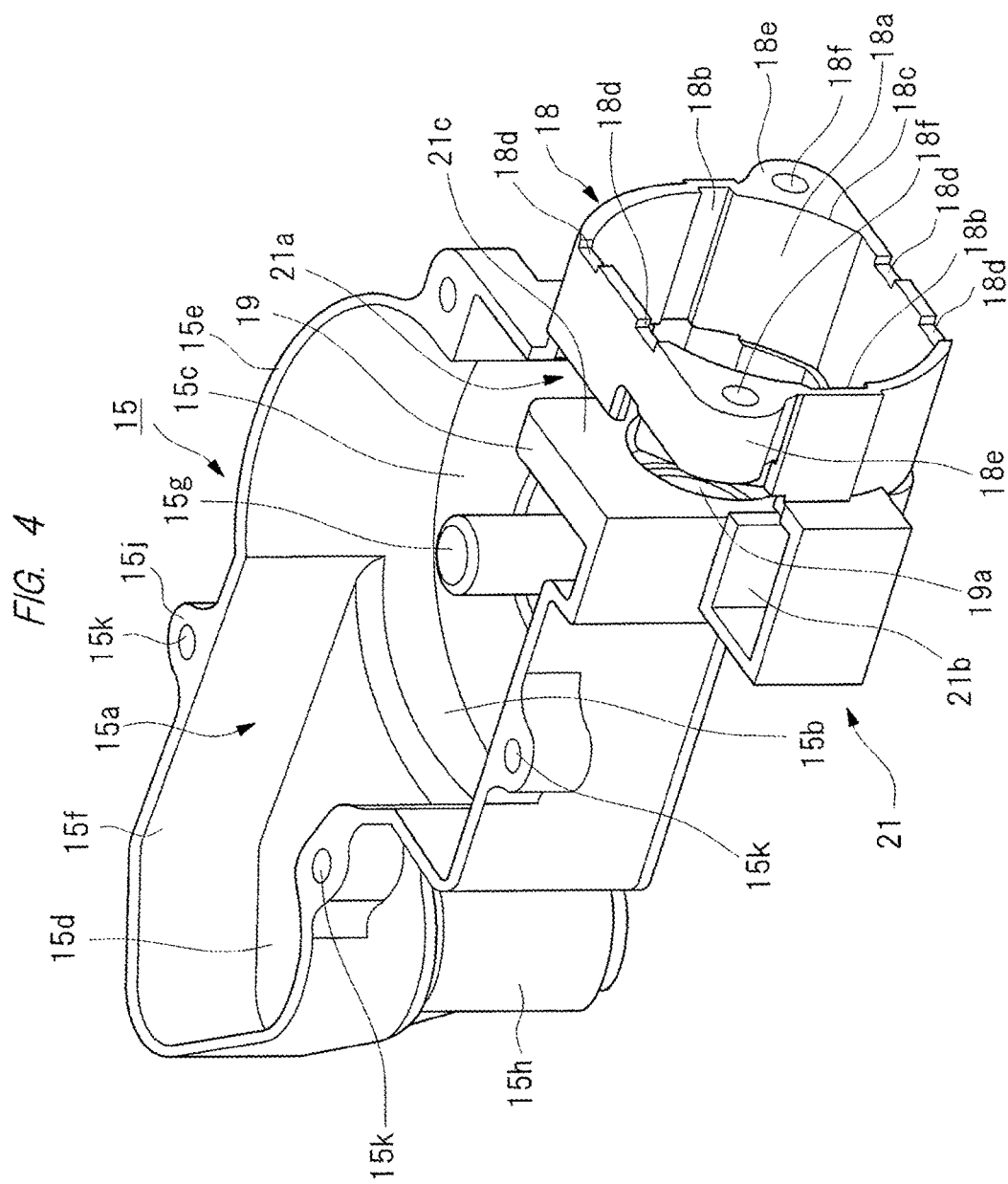
FIG. 4 is a perspective view showing a single housing of the components forming the electric motor apparatus of the present invention.
Figure 6:
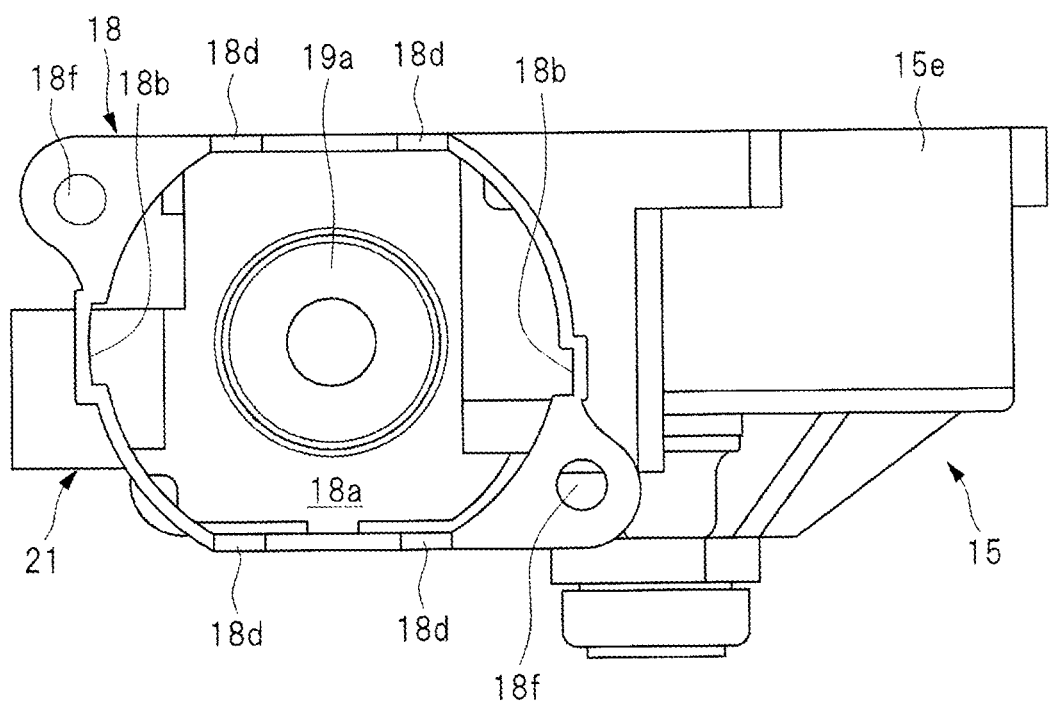
FIG. 6 is a side view showing the single housing of the components forming the electric motor apparatus of the present invention.

In addition, shown in FIGS. 2, 4, and 6, a cylindrical holding portion 18 which supports a brush holder (to be described later) is provided on the bottom portion 15c side of the housing 15. The holding portion 18 forms part of the housing 15. A holding hole 18a is provided to the holding portion 18 so as to penetrate through the holding portion 18 in a direction along the axis A. A groove 18b is formed on the inner circumference of the holding hole 18a so as to extend along a direction along the axis A. An opening portion 18c is formed at the end portion of the holding hole 18a which is located on the opposite side to the bottom portion 15c. A plurality of locking grooves 18d are formed, along the circumferential direction, on the end portion of the holding portion 18 which is located on the opening portion 18c side. In addition, a protruding portion 18e is provided on the outer circumference of the holding portion 18 so as to protrude outward. A screw hole 18f is formed in the protruding portion 18e. The opening end of the yoke 16a is brought into contact with the opening end of the holding portion 18, and a screw member 16g is inserted into the hole 16f of the flange portion 16e and fastened, thereby fixing the yoke 16a to the housing 15.

Further, a support wall 19 is provided between the holding portion 18 and the bottom portion 15c of the housing 15. A shaft hole 19a is formed in the support wall 19. The shaft hole 19a penetrates through the support wall 19 in a direction along the axis A to make the accommodation chamber 15a communicate with the holding hole 18a. As shown in FIG. 3, a portion, of the armature shaft 17a, which is disposed inside the housing 15 is disposed across the holding hole 18a, the shaft hole 19a, and the accommodation chamber 15a. The bearing 17e is disposed in the shaft hole 19a. The support wall 19 supports the outer ring (not shown) of the bearing 17e. The bearing 17e and the bearing 16d are disposed coaxially. The bearing 16d supports one end of the armature shaft 17a inside the yoke 16a. The bearing 17e supports part of the armature shaft 17a inside the housing 15. In this manner, the two bearings 16d and 17e support the armature shaft 17a so as to make it rotatable about the axis A.

Figure 5:
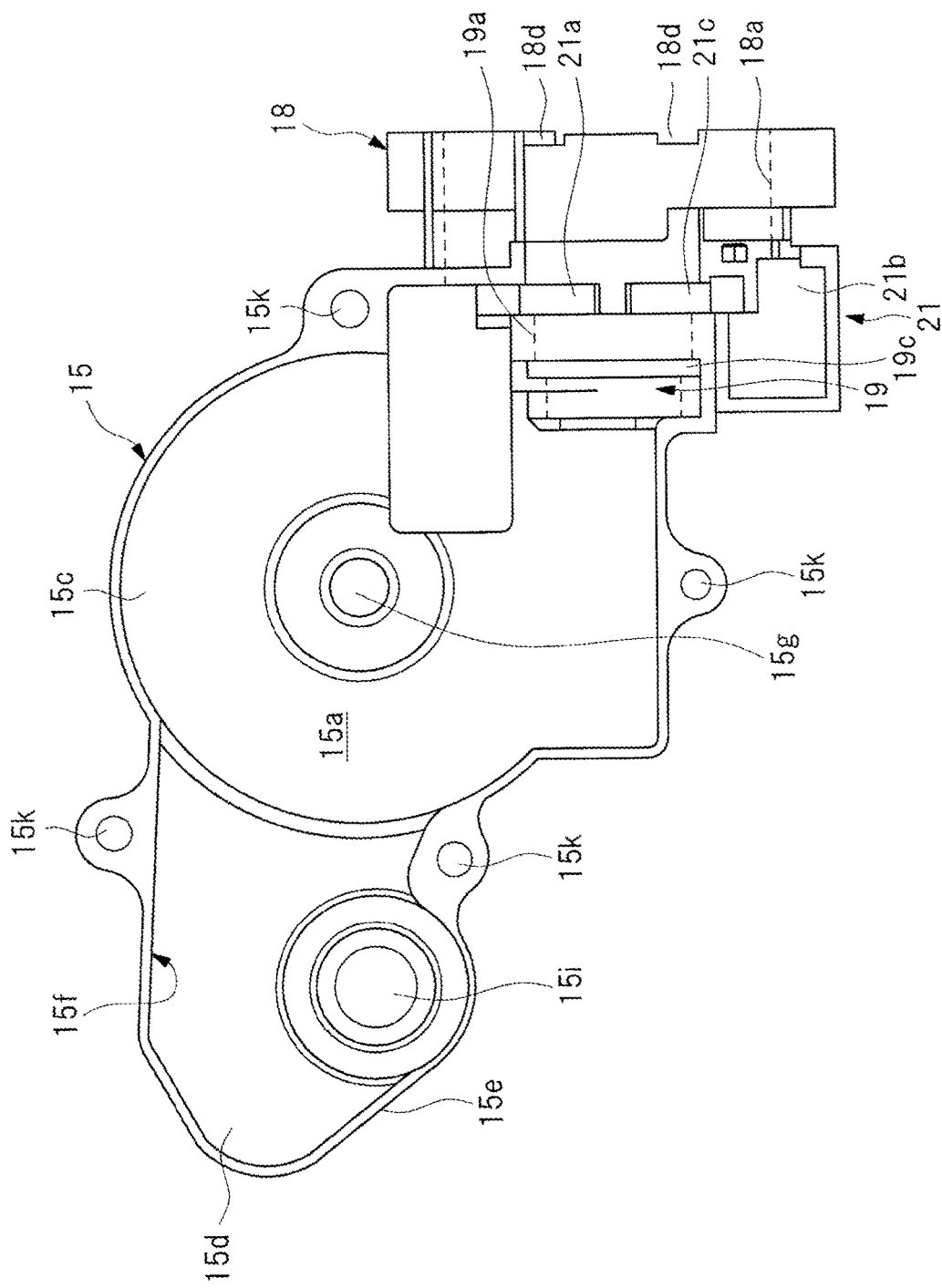
FIG. 5 is a plan view showing the single housing of the components forming the electric motor apparatus of the present invention.
Figure 7:
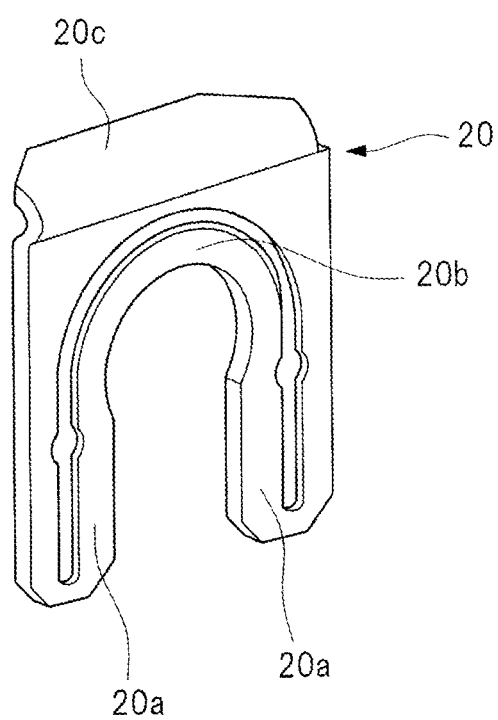
FIG. 7 is a perspective view showing a single stopper of the components forming the electric motor apparatus of the present invention.

In addition, as shown in FIGS. 3 and 5, an arc installation groove 19b is provided on the inner circumference of the support wall 19. In addition, a slit 19c penetrates through the support wall 19 in the radial direction. The slit 19c communicates with the shaft hole 19a. A stopper 20 is inserted into the slit 19c and the installation groove 19b. The stopper 20 has a U shape as shown in FIGS. 2 and 7, and is formed from a leaf spring. That is, the stopper 20 includes two leg portions 20a extending parallel to each other and a connection portion 20b which connects the two leg portions 20a. A space is formed between the two leg portions 20a. On the other hand, a contact portion 20c is formed on the upper end of the connection portion 20b so as to extend in a direction at a right angle to the leg portions 20a. The connection portion 20b is disposed inside the slit 19c, and the contact portion 20c is disposed outside the support wall 19.

While part of the armature shaft 17a is disposed in the accommodation chamber 15a of the housing 15, and an end face of the bearing 17e is in contact with an end face of the support wall 19, the stopper 20 is inserted into the installation groove 19b through the slit 19c, and the contact portion 20c comes into contact with the upper surface of the support wall 19, thereby stopping the stopper 20. In the installed state of the stopper 20, part of the armature shaft 17a is disposed between the two leg portions 20a. In this manner, the stopper 20 and the end face of the support wall 19 clamp the bearing 17e to position and fix the armature shaft 17a in a direction along the axis A.

A concave portion 21 forming part of the housing 15 will be described next with reference to FIGS. 2, 3, 4, 5, and 8. The concave portion 21 is a groove portion provided to fit a connector unit (to be described later) therein. The concave portion 21 is provided between the holding portion 18 and the support wall 19 in a direction along the axis A of the housing 15. The concave portion 21 includes a first accommodation portion 21a provided along a planar direction perpendicular to the axis A and a second accommodation portion 21b formed continuously with the first accommodation portion 21a. The first accommodation portion 21a is provided between the support wall 19 and the holding portion 18 in a direction along the axis A. The first accommodation portion 21a is a groove extending to intersect with the axis A. The shaft hole 19a communicates with the holding hole 18a through the first accommodation portion 21a. The second accommodation portion 21b is disposed outside the support wall 19 in the radial direction centered on the axis A. The second accommodation portion 21b is a rectangular parallelepiped space. The first accommodation portion 21a and the second accommodation portion 21b have a common opening portion 21c. The opening portion 21c is formed along a planar direction parallel to the axis A. More specifically, the opening portion 21c is disposed parallel to the opening portion 15f.

The arrangement of the speed-reduction mechanism 14 will be described next with reference to FIGS. 2, 3, and 8. The speed-reduction mechanism 14 includes the worm 17d formed on the armature shaft 17a and a worm wheel (helical gear) 14a meshing with the worm 17d. The speed-reduction mechanism 14 makes the number of revolutions of the worm wheel 14a smaller than that of the armature shaft 17a when transmitting motive power from the armature shaft 17a to the worm wheel 14a. When the torque of the electric motor 13 is transmitted to the worm wheel 14a in this manner, the torque is amplified.

The worm 17d is formed on a portion, of the armature shaft 17a, which is located on the bottom portion 15c side. In addition, the worm wheel 14a is disposed on the bottom portion 15c side. The support shaft 15g is inserted into a shaft hole 14b of the worm wheel 14a. A plurality of holes 14c are formed in the worm wheel 14a at positions eccentric to the support shaft 15g. The holes 14c differ in the amount of eccentricity with respect to the support shaft 15g.

The arrangement of the motive-power transmission route between the worm wheel 14a and the pivot shaft 12 will be described next with reference to FIGS. 2 and 8. One end of a link 22 is fixed to an end portion of the pivot shaft 12 which is located on the accommodation chamber 15a side. That is, the pivot shaft 12 is coupled to the link 22 so as to make them rotate together. In addition, the other end of the link 22 is relatively rotatably coupled to one end of a con rod 23. A pin 23a is installed to the other end of the con rod 23. The pin 23a is inserted into any one of the holes 14c of the worm wheel 14a. While the pin 23a is inserted in the hole 14c, the pin 23a can rotate with respect to the worm wheel 14a. Changing the hole 14c into the pin 23a is to be inserted can change the swinging angle range of the wiper arm. The worm wheel 14a, the con rod 23, link 22, and the pivot shaft 12 form a motive power conversion mechanism for converting the rotating motion of the armature shaft 17a into the swinging motion of the wiper arm. The speed-reduction mechanism 14 is disposed between the yoke 16a and the pivot shaft 12 in a direction along the axis A.

The arrangement of the accommodation chamber 15a of the housing 15 will be described next with reference to FIGS. 1, 2, and 8. A protruding portion 15j is formed on the sidewall 15e of the housing 15 so as to protrude outward, and a screw hole 15k is formed in the protruding portion 15j. A plate-like bracket 24 sealing the opening portion 15f is provided. The bracket 24 is formed by press working of a metal material. A hole 24a penetrates through the bracket 24 in the thickness direction, so that the bracket 24 is fixed to the housing 15 by fastening a screw member 24b inserted in the hole 24a. That is, the bracket 24 is a cover sealing the opening portion 15f. Note that the bracket 24 is fixed to the vehicle body with screw members (not shown).

A connector unit 25 forming part of an element which feeds power to the coil 17c will be described next with reference to FIGS. 2, 3, 8, and 9. The connector unit 25 includes a connector box 25a and a plate portion 25b formed continuously with the connector box 25a. The connector box 25a and the plate portion 25b are integrally formed mainly by injection molding using a resin material. The plate portion 25b is fitted in the first accommodation portion 21a, and the connector box 25a is fitted in the second accommodation portion 21b.

The connector box 25a has a rectangular box shape as a planar shape. Three terminals 25c, 25d, and 25e are installed to the bottom portion of the connector box 25a. Of these terminals, the two terminals 25c and 25e extend to the plate portion 25b side and protrude toward the holding hole 18a side. The remaining terminal 25d extends along the planar direction of the plate portion 25b. Two conductive leaf springs 25f and 25g are installed to the plate portion 25b. Contact plates (not shown) are provided on the distal ends of the leaf springs 25f and 25g.

The contact plates and the leaf springs 25f and 25g form a mechanism for detecting the rotational phase (rotational position) of the worm wheel 14a. The contact plates are provided inside the accommodation chamber 15a of the housing 15, more specifically, below the worm wheel 14a. In addition, the terminal 25c is electrically connected to the leaf spring 25g, and the terminal 25d is electrically connected to the leaf spring 25f. In addition, a shaft hole 25h penetrates through the plate portion 25b in a direction along the axis A. The armature shaft 17a is inserted into the shaft hole 25h.

In addition, while the connector unit 25 is fitted in the concave portion 21 of the housing 15, the plate portion 25b is in contact with the support wall 19, the plate portion 25b is in contact with the holding portion 18, and the outer surface of the connector box 25a is in contact with the inner surface of the second accommodation portion 21b. In this manner, the connector unit 25 and the housing 15 are positioned in a direction along the axis A and a direction at a right angle to the axis A in a planar direction including the axis A.

Figure 8:
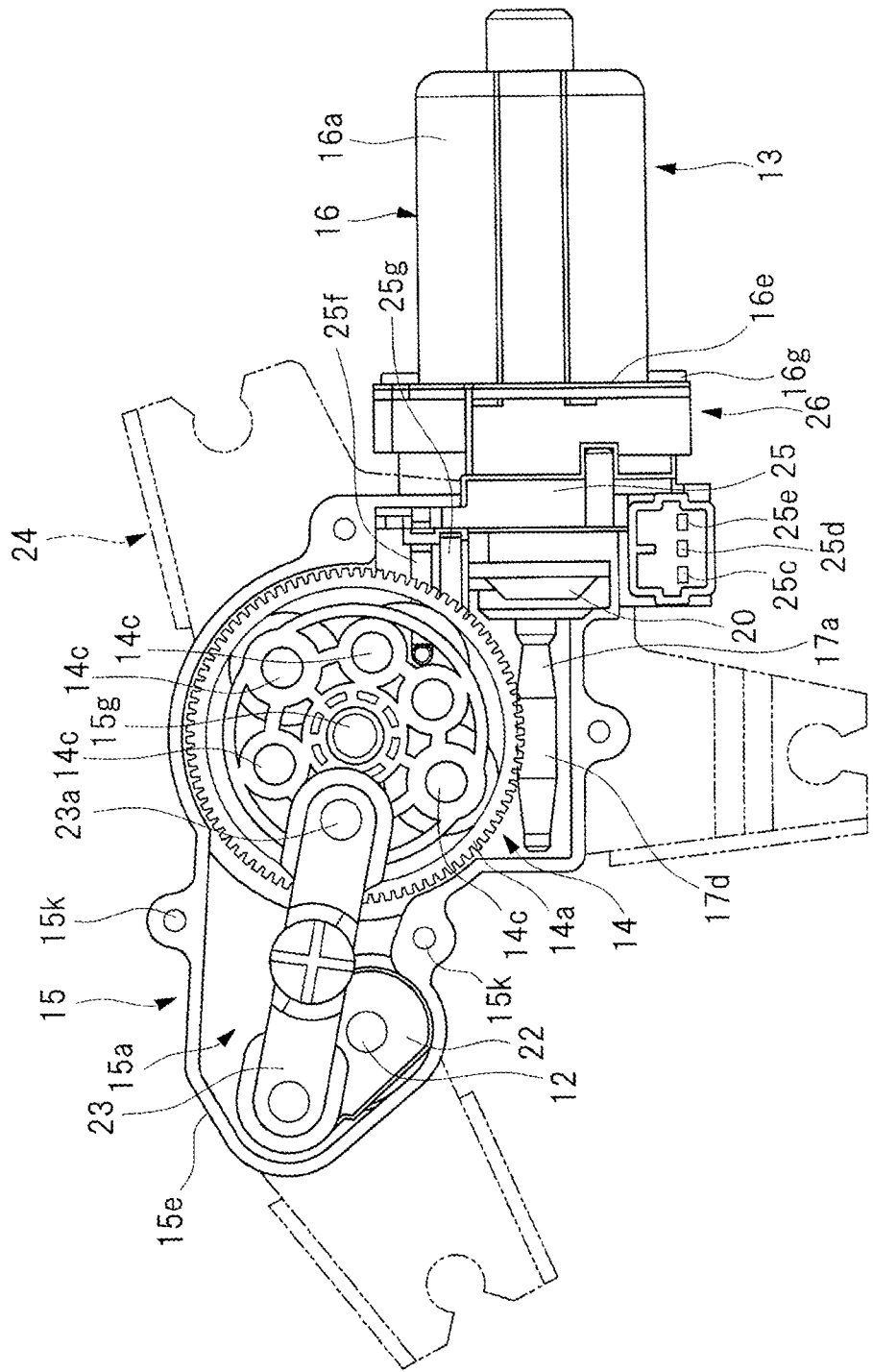
FIG. 8 is a plan view showing a state before a bracket is installed to the housing upon assembly of the electric motor apparatus of the present invention.
Figure 9:
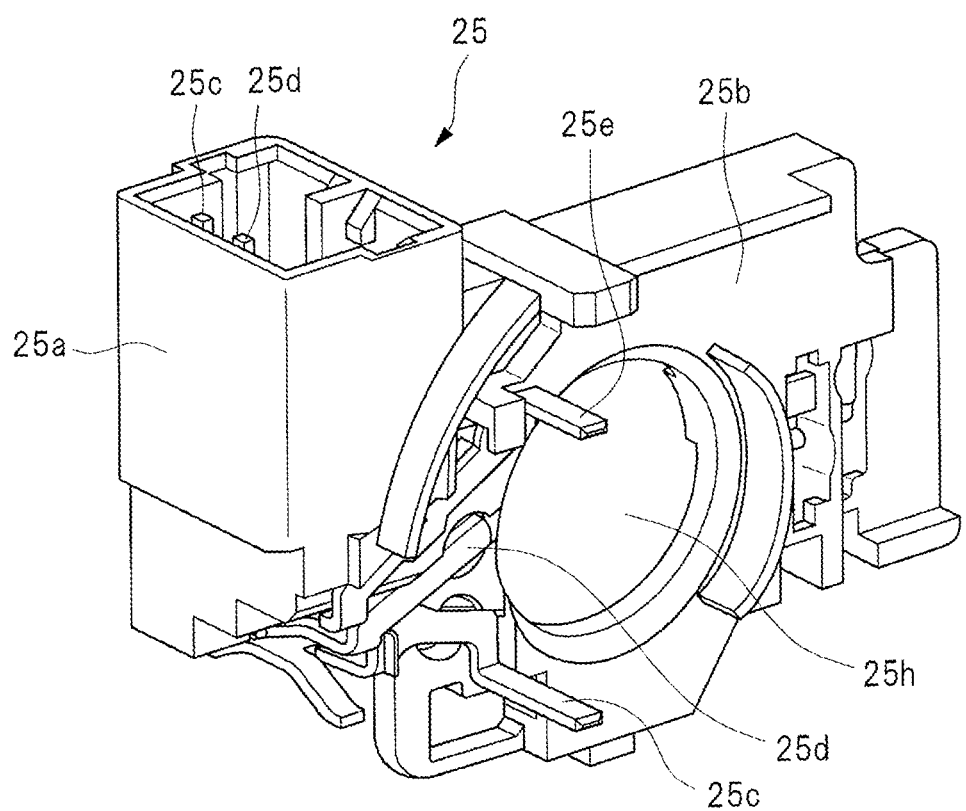
FIG. 9 is a perspective view showing a single connector unit of the components forming the electric motor apparatus of the present invention.
Figure 10:
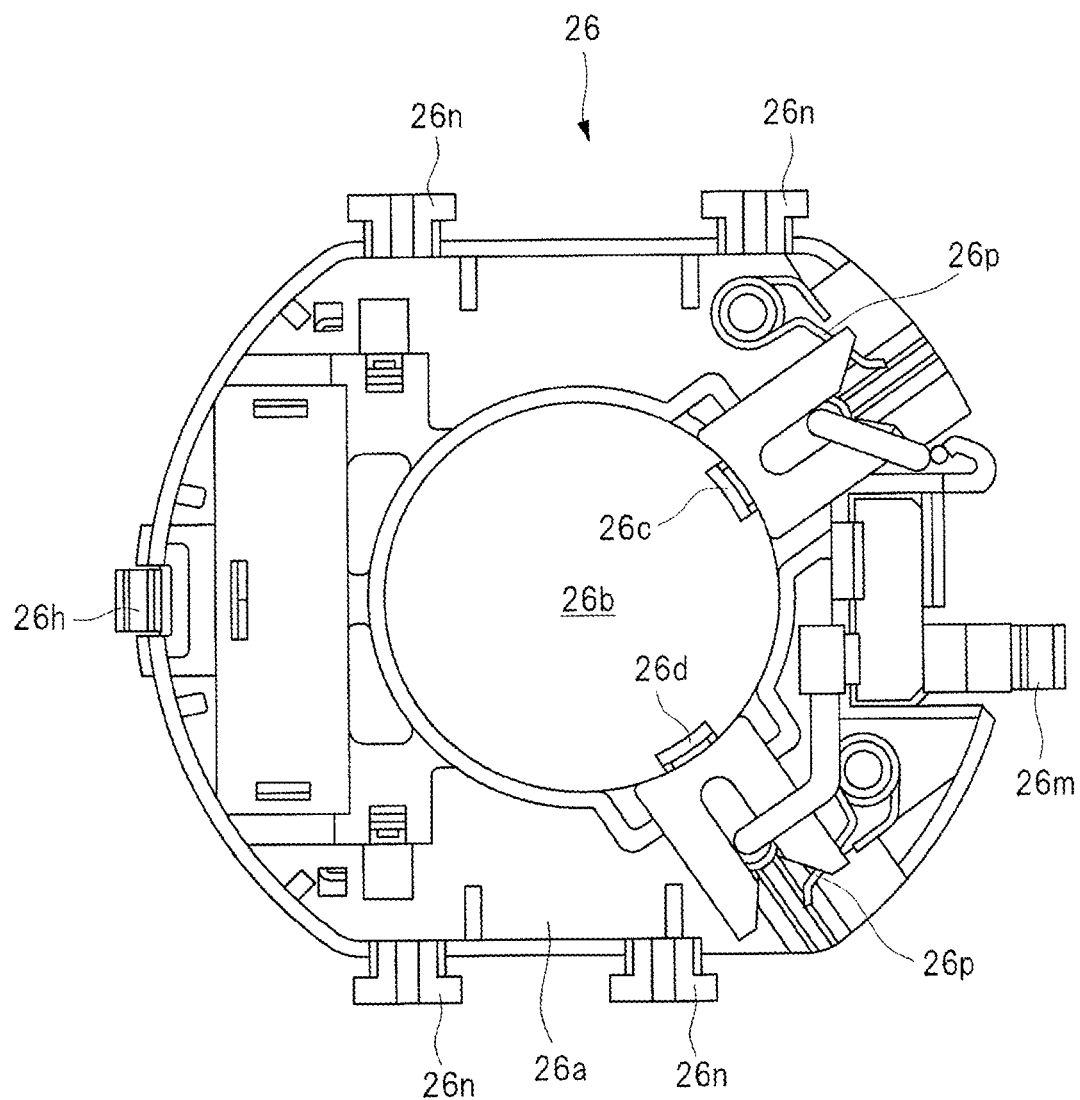
FIG. 10 is a side view showing a single brush holder of the components forming the electric motor apparatus of the present invention.
Figure 11:
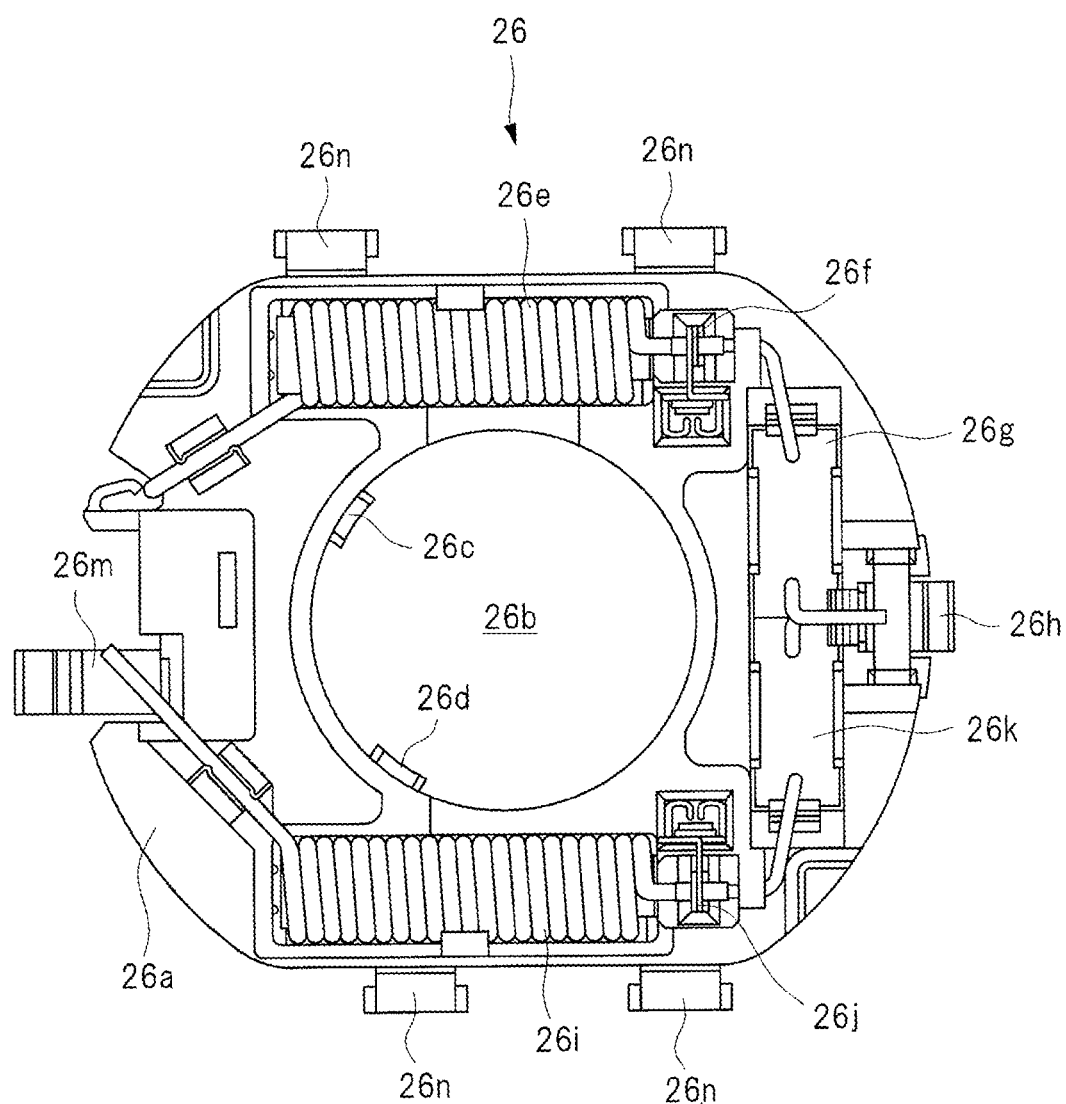
FIG. 11 is a side view of the single brush holder of the components forming the electric motor apparatus of the present invention when viewed from the opposite side to that in FIG. 10.

In addition, while the connector unit 25 is inserted in the concave portion 21 and the bracket 24 is fixed to the housing 15, part of the bracket 24 is in contact with the upper surface of the plate portion 25b, as shown in FIG. 8. That is, the housing 15 and the bracket 24 clamp the connector unit 25 to inhibit the connector unit 25 from coming off the concave portion 21. In addition, the planar shape of the bracket 24 prevents the bracket 24 from covering the connector box 25a when the bracket 24 is fixed to the housing 15. For this reason, while the bracket 24 is fixed to the housing 15, it is possible to attach and detach an external connector to and from the connector box 25a without detaching the bracket 24.

A brush holder 26 forming part of an element for feeding power to the coil 17c will be described with reference to FIGS. 2, 3, 10, and 11. The brush holder 26 is installed to the holding portion 18. The brush holder 26 includes a cylindrical stay 26a made of a resin material. A shaft hole 26b is formed in the stay 26a. The commutator 17f of the armature shaft 17a is positioned in the shaft hole 26b. Two brushes 26c and 26d are installed to the stay 26a. The brushes 26c and 26d are configured to be movable in the radial direction of the shaft hole 26b. Springs 26p press the two brushes 26c and 26d toward the armature shaft 17a.

A terminal 26f is connected to one brush 26c via a choke coil 26e. A ground terminal 26h is connected to the terminal 26f via a capacitor 26g. The ground terminal 26h is installed to the outer circumference of the stay 26a. A terminal 26j is conductively (electrically) connected to the other brush 26d via a choke coil 26i. The terminals 26f and 26j each are formed into a plate-like shape from a conductive metal material press working. The ground terminal 26h is conductively connected to the terminal 26j via a capacitor 26k. Another ground terminal 26m is conductively connected to the brush 26d. The ground terminal 26m is installed to the outer circumference of the stay 26a. A plurality of locking pawls 26n are provided on the outer circumference of the stay 26a along the circumferential direction.

While the brush holder 26 is inserted in the holding hole 18a of the holding portion 18, the locking pawls 26n are locked in the locking grooves 18d, and the holding portion 18 and the brush holder 26 are positioned in the circumferential direction centered on the axis A. In addition, while the locking pawls 26n are locked in the locking grooves 18d and the yoke 16a is fixed to the housing 15, the locking pawls 26n are clamped between the yoke 16a and the holding portion 18, and the brush holder 26 is fixed to the holding portion 18 in a direction along the axis A. In addition, while the holding portion 18 and the brush holder 26 are positioned and fixed, the two brushes 26c and 26d are in contact with a commutator 17f.

In addition, the two ground terminals 26h and 26m are positioned in the grooves 18b and are conductively connected to the holding portion 18. Furthermore, while the connector unit 25 is fitted in the concave portion 21 and the brush holder 26 is installed to the holding portion 18, the terminal 25e is connected to the terminal 26f, and the terminal 25c is connected to the terminal 26j. While the brush holder 26 is positioned and fixed to the holding portion 18, the connection portion between the terminals 25e and 26f and the connection portion between the terminals 25c and 26j are both positioned in the holding hole 18a.

While the electric motor apparatus 10 having the above-described arrangement is installed to the vehicle, an external connector is connected to the connector box 25a of the connector unit 25. An electric wire (not shown) is connected to this external connector. This electric wire is connected to a changeover switch (not shown) which is connected and disconnected.

When the wiper switch is turned on in the vehicle to which the electric motor apparatus 10 is installed, the changeover switch is connected. Power is then fed from the power supply (the battery, capacitor, and the like) installed to the vehicle to the coil 17c via the electric wire, the respective terminals, and the brushes 26c and 26d to form a rotating magnetic field between the coil 17c and the permanent magnets 16b and rotate the armature shaft 17a in a predetermined direction. When the torque of the armature shaft 17a is transmitted to the worm wheel 14a, the worm wheel 14a rotates about the support shaft 15g. As the worm wheel 14a rotates, the con rod 23 is actuated, and the link 22 swings about the pivot shaft 12. This makes the wiper arm coupled to the pivot shaft 12 swing within a predetermined angle range.

A method of assembling the electric motor apparatus 10 will be described next with reference to FIGS. 2, 3, and 8. The automated machine (not shown) is used to assemble the electric motor apparatus 10. First, as shown in FIGS. 1 and 4, the housing 15 is supported while the opening portion 15f faces upward. The connector unit 25 with the plate portion 25b extending almost perpendicular is then moved along a direction (first direction) perpendicular to a plane including the opening portion 15f. That is, the connector unit 25 is moved downward toward the housing 15 to insert the connector unit 25 into the concave portion 21. When the connector unit 25 is inserted into the concave portion 21, the lower end of the connector unit 25 comes into contact with the bottom surface of the concave portion 21 and stops. In addition, portions of the two end faces of the plate portion 25b come into contact with the support wall 19 and the holding portion 18 to position the connector unit 25 in a direction along the axis A. When the connector unit 25 is installed to the concave portion 21, the upper end of the plate portion 25b and the upper end of the sidewall 15e of the housing 15 are located on the same plane. As described above, the step of installing the connector unit 25 to the concave portion 21 is the first step in the present invention.

Following the first step, as shown in FIG. 1, the brush holder 26 is supported while the center line of the shaft hole 26b of the brush holder 26 is kept almost horizontal. The brush holder 26 is then moved in a direction (second direction) along the axis A and inserted into the holding hole 18a. When the locking pawls 26n are inserted into the locking grooves 18d, the holding portion 18 and the brush holder 26 are positioned in the circumferential direction centered on the axis A. When the holding portion 18 and the brush holder 26 are positioned in the circumferential direction, the terminal 25e is in contact with the terminal 26f, and the terminal 25c is in contact with the terminal 26j. The step of installing the brush holder 26 in the holding hole 18a and conductively connecting the terminals 25c and 25e of the connector unit 25 to the brushes 26c and 26d in this manner is the second step in the present invention.

Following the second step, the rotor assembly 17 is moved in a direction along the axis A, that is, along the second direction to insert the distal end of the armature shaft 17a into the accommodation chamber 15a of the housing 15 through the shaft holes 26b and 19a. When the end face of the bearing 17e comes into contact with the end face of the support wall 19, the rotor assembly 17 is stopped. In addition, when the stopper 20 is moved along the first direction to insert the stopper into the installation groove 19b via the slit 19c, the armature shaft 17a and the housing 15 are positioned and fixed in a direction along the axis A. When the armature shaft 17a and the housing 15 are positioned in a direction along the axis A, the brushes 26c and 26d come into contact with the commutator 17f. The step of moving the armature shaft 17a along the second direction, disposing a portion of the armature shaft 17a on which the worm 17d is formed in the accommodation chamber 15a, and bringing the brushes 26c and 26d into contact with the commutator 17f in this manner is the third step in the present invention.

Following the third step, the worm wheel 14a is placed perpendicular to the center line (not shown) of the shaft hole 14b, and the worm wheel 14a is moved downward in the vertical direction (first direction) to accommodate the worm wheel 14a into the accommodation chamber 15a of the housing 15. In this case, the support shaft 15g is inserted into the shaft hole 14b, and the worm 17d is meshed with the gear of the worm wheel 14a. In addition, the distal end of the pivot shaft 12 is moved downward and inserted into the shaft hole 15i of the housing 15, and the link 22 is coupled to the worm wheel 14a through the con rod 23. The step of disposing the worm wheel 14a, the link 22, and the con rod 23 in the accommodation chamber 15a and coupling them to each other, in this manner, such that motive power can be transmitted to each other is the fourth step in the present invention.

On the other hand, the yoke 16a is moved in a direction along the axis A, that is, the second direction, and the flange portion 16e comes into contact with the holding portion 18. The yoke 16a is then fixed to the housing 15 by fastening the screw member 16g. When the yoke 16a is fixed to the housing 15, the locking pawls 26n of the brush holder 26 are clamped by the holding portion 18 and the flange portion 16e to position and fix the brush holder 26 to the housing 15. The step of moving the yoke 16a along the second direction and fixing the yoke 16a to the housing 15 in this manner is the fifth step in the present invention. Note that in assembling the electric motor apparatus 10, the fourth and fifth steps may be performed in an arbitrary order, or concurrently.

Subsequently, the opening portion 15f of the housing 15 is sealed by the bracket 24, and the bracket 24 is fixed to the housing 15 by fastening the screw member 24b. As shown in FIG. 8, when the bracket 24 is fixed to the housing 15, part of the bracket 24 comes into contact with the upper end of the plate portion 25b. The connector unit 25 is then clamped by the housing 15 and the bracket 24. As a result, the connector unit 25 is fixed in the concave portion 21 so as not to come off it.

As described above, in the electric motor apparatus 10 of this embodiment, the connector unit 25 installed to the housing 15 and the brush holder 26 installed to the holding hole 18a of the housing 15 are physically discrete components. For this reason, while the electric motor apparatus 10 is assembled, it is possible to decide the disposition position of the connector unit 25 independently of the disposition position of the brush holder 26. That is, it is possible to arbitrarily determine the arrangement of the electric motor apparatus 10 to be installed to a vehicle in advance in consideration of the connection positions of the connector unit 25 and an external connector (not shown) and the positional relationship between surrounding components. Therefore, no restrictions are imposed on the routing of an external connector on the vehicle side on which the electric motor apparatus 10 is to be installed.

In addition, the electric motor apparatus 10 in this embodiment is configured such that when the bracket 24 seals the opening portion 15*f* of the housing 15 and the bracket 24 is fixed to the housing 15 by fastening the screw member 24*b*, the connector unit 25 is fixed to the housing 15 with the bracket 24. That is, the bracket 24 has both a function as a cover which seals the opening portion 15*f* and a function of fixing the connector unit 25 to the housing 15. This eliminates the necessity to separately prepare a dedicated fixing element for fixing the housing 15 to the connector unit 25, e.g., a screw member, and hence can suppress an increase in the number of components.

In the method of assembling the electric motor apparatus 10 according to this embodiment, elements such as the speed-reduction mechanism 14, the connector unit 25, and the stopper 20 are moved along the first direction and installed to the housing 15. In contrast to this, elements such as the brush holder 26, the rotor assembly 17, and the yoke 16*a* are moved along the second direction and installed to the housing 15. That is, the electric motor apparatus 10 can be assembled by moving components in two directions at a right angle to each other with respect to the housing 15 and installing them to the housing 15. It is, therefore, possible to assemble the electric motor apparatus 10 without vertically inverting the housing 15 by supporting it using the automated machine, with the opening portion 15*f* of the housing 15 facing upward. This makes it possible to easily construct an assembly line for the electric motor apparatus 10.

In addition, the electric motor apparatus 10 according to this embodiment includes the brush holder and the connector unit as discrete components. That is, it is possible to mold the brush holder 26 and the connector unit 25 in a process of manufacturing components of the electric motor apparatus 10, more specifically, in an injection molding process, by injecting a resin material into different molds. This makes it possible to separately mold the brush holder 26 and the connector unit 25 in accordance with the conditions required for the vehicle. Assume that the disposition phase between a plurality of brushes (the disposition angle between brushes) or the number of brushes is to be changed in the circumferential direction centered on the axis to obtain an actual torque matching a required torque. In this case, it is possible to independently change the shape and dimensions of the brush holder 26 regardless of the shape and dimensions of the connector unit 25. In addition, it is also possible to independently change the shape and dimensions of the connector unit 25 in accordance with the shape and dimensions of an external connector regardless of the shape and dimensions of the brush holder 26 or to change the number of terminals of the connector unit 25 in accordance with a change in the number of terminals of an external connector.

In addition, the electric motor apparatus 10 according to this embodiment includes the connector unit 25 and the brush holder 26 as discrete components. For this reason, in a process of manufacturing components of the electric motor apparatus 10, when forming the connector unit 25 and the brush holder 26 by injection molding using different molds, it is possible to form a plurality of connector units 25 with one mold and form a plurality of brush holders 26 with one mold. This can maximize the number of molded components released from one mold (the number of cavities), and hence improves the productivity of each component. In addition, when changing the shape and dimensions of either the connector unit 25 or the brush holder 26, it is only required to change the design of the mold for molding the corresponding component. That is, it is not necessary to change the design of the mold for molding the component whose shape and dimensions are not to be changed. This can suppress an increase in the manufacturing cost of a mold. At the time of molding of a connector unit, in particular, since the terminals inserted in cavities (not shown) are bent in three-dimensional directions, it is not necessary to change the mold for molding the connector unit when changing only the shape and dimensions of the brush holder. This can suppress an increase in manufacturing cost.

In addition, in the electric motor apparatus 10 according to this embodiment, the brush holder 26 held in the holding hole 18*a* is fixed by being clamped between the housing 15 and the yoke 16*a*. At this time, the plurality of locking pawls 26*n* are provided on the outer circumference of the brush holder 26 and locked in the locking grooves 18*d* of the housing 15. The stay 26*a* of the brush holder 26 is accommodated in the housing 15. For this reason, at least the outer circumference of the brush holder 26 is not disposed inside the yoke 16*a*. That is, almost the entire brush holder 26 is accommodated in the housing 15, and almost only part of the brush holder 26 is disposed in the yoke 16*a*. Therefore, the portion of the yoke 16*a* which is located on the opening side need not be a special shape to accommodate in the brush holder 26. This improves the moldability (formability) of the yoke 16*a*. In addition, this structure can shorten the length of the yoke 16*a* in the axial direction and achieve a reduction in weight as compared with the structure having the brush holder 26 accommodated in the yoke 16*a*.

The correspondence relationship between the arrangement described in this embodiment and the arrangement of the present invention will be described below. Elements such as the speed-reduction mechanism 14, the link 22, and the con rod 23 correspond to the motive-power transmission mechanism of the present invention. The opening portion 21*c* corresponds to the first opening portion of the present invention. The opening portion 18*c* corresponds to the second opening portion of the present invention. The opening portion 15*f* corresponds to the third opening portion of the present invention. The accommodation chamber 15*a* corresponds to the accommodation chamber of the present invention. The terminals 26*f* and 26*j* correspond to the first terminals of the present invention. The terminals 25*c* and 25*e* correspond to the second terminals of the present invention. The bracket 24 corresponds to the lid member of the present invention.

In addition, obviously, the present invention is not limited to the above-described embodiment, and can be variously changed without departing from the spirit of the invention. The electric motor apparatus of the present invention can be used as a motive power source for actuating the actuation members. For example, the electric motor apparatus of the present invention can be used for a power window unit. The power window unit is a mechanism for converting the rotating motion of the electric motor provided inside the door into the elevating motion (linear motion) of the door glass (actuation member). Since this power window unit is known as disclosed in Japanese Patent Laid-Open Nos. 2011-132685 and 2011-140787 and the like, a description of a specific arrangement will be omitted.

In addition, in the above-described embodiment, the terminals 25*c* and 25*e* of the connector unit 25 are shaped to protrude toward the brush holder 26, and the terminals 26f and 26j connected to the terminals 25c and 25e are provided on the brush holder 26. However, the present invention is not limited to this structure. The relationship in shape between the terminals 25c and 25e and the terminals 26f and 26j may be reversed. That is, the terminals 26f and 26j may be shaped to protrude, while the terminals 25c and 25e may not protrude. Furthermore, the terminals 25c and 25e of the connector unit 25 may protrude, and the terminals 26f and 26j of the brush holder 26 may also protrude.

(Second Embodiment)

Figure 12:
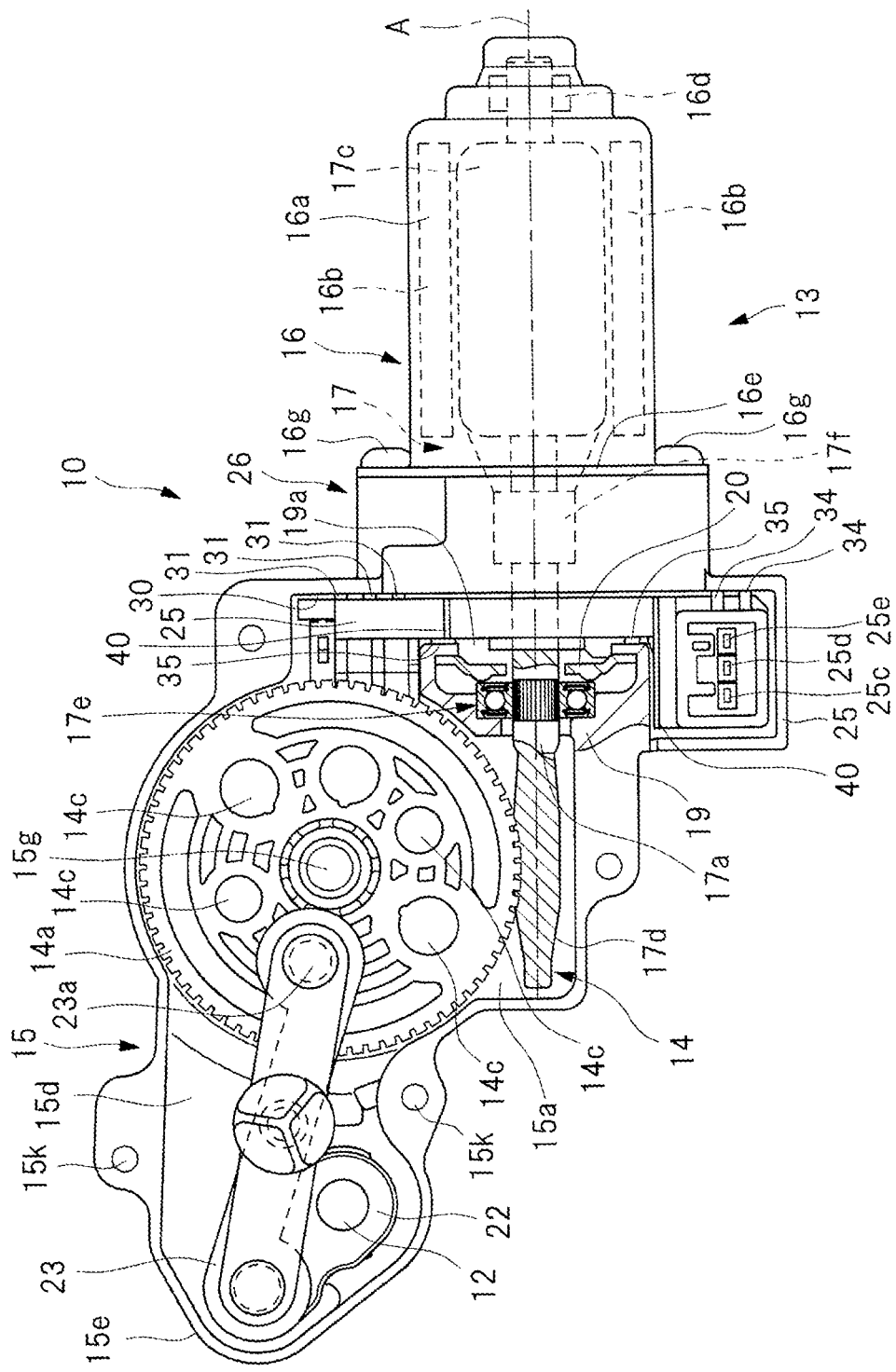
FIG. 12 is a plan view showing the electric motor apparatus of the present invention.
Figure 13:
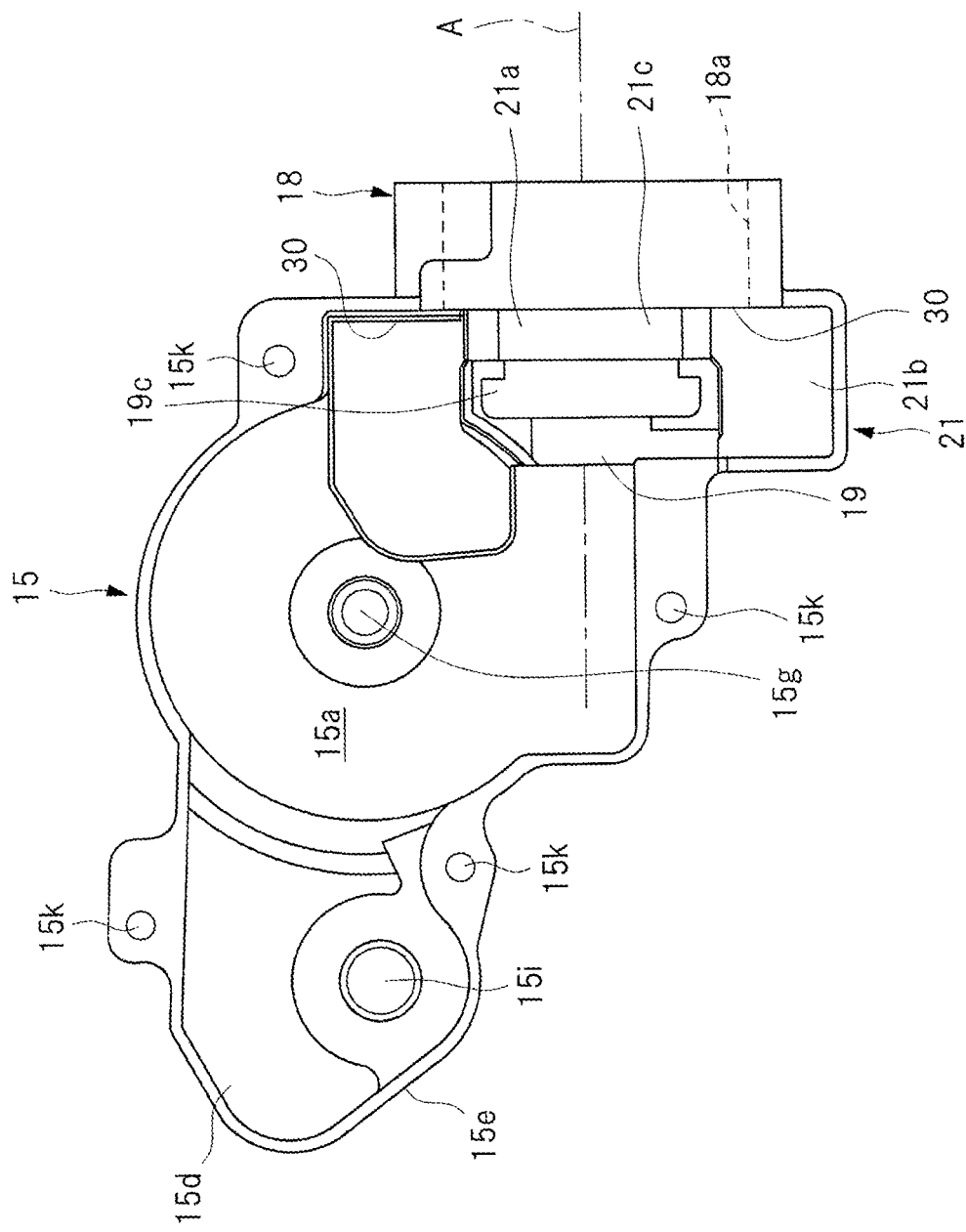
FIG. 13 is a side view showing the single housing in FIG. 12.
Figure 14:
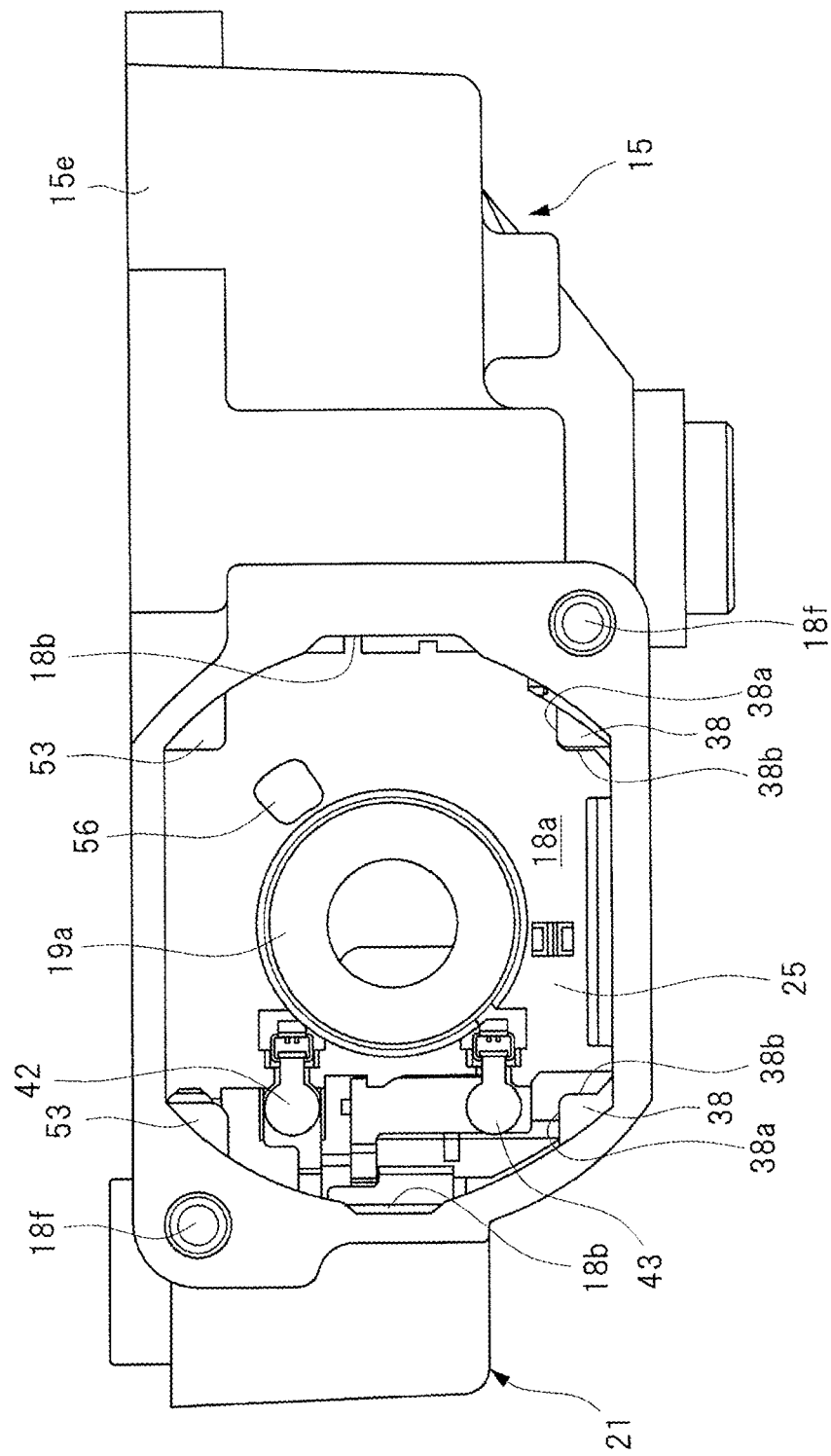
FIG. 14 is a perspective view of a connector unit installed to the housing in FIG. 12.
Figure 15:
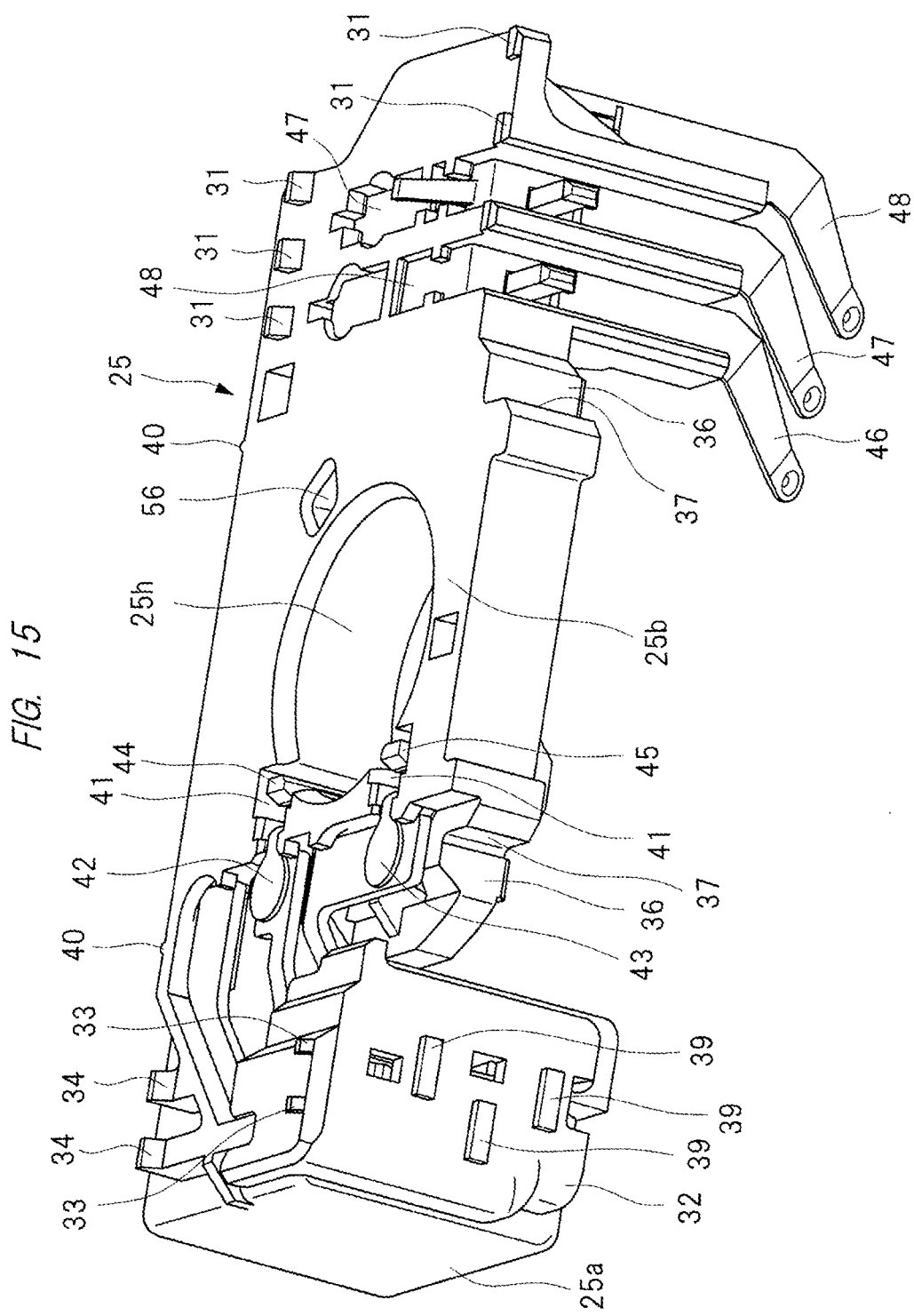
FIG. 15 is a perspective view of the connector unit installed to the housing in FIG. 12.
Figure 16:
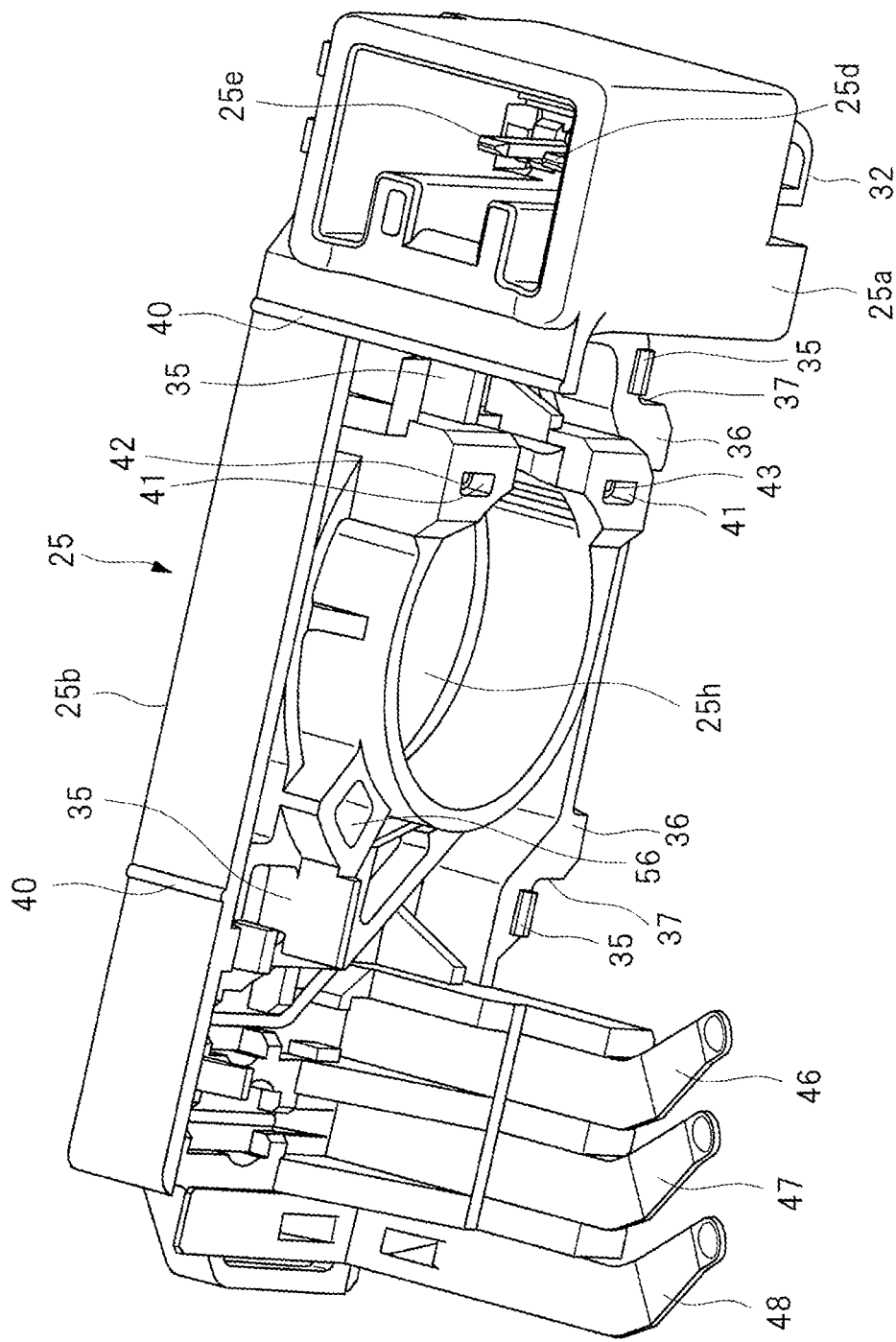
FIG. 16 is a plan view of the connector unit in FIG. 12.
Figure 17:
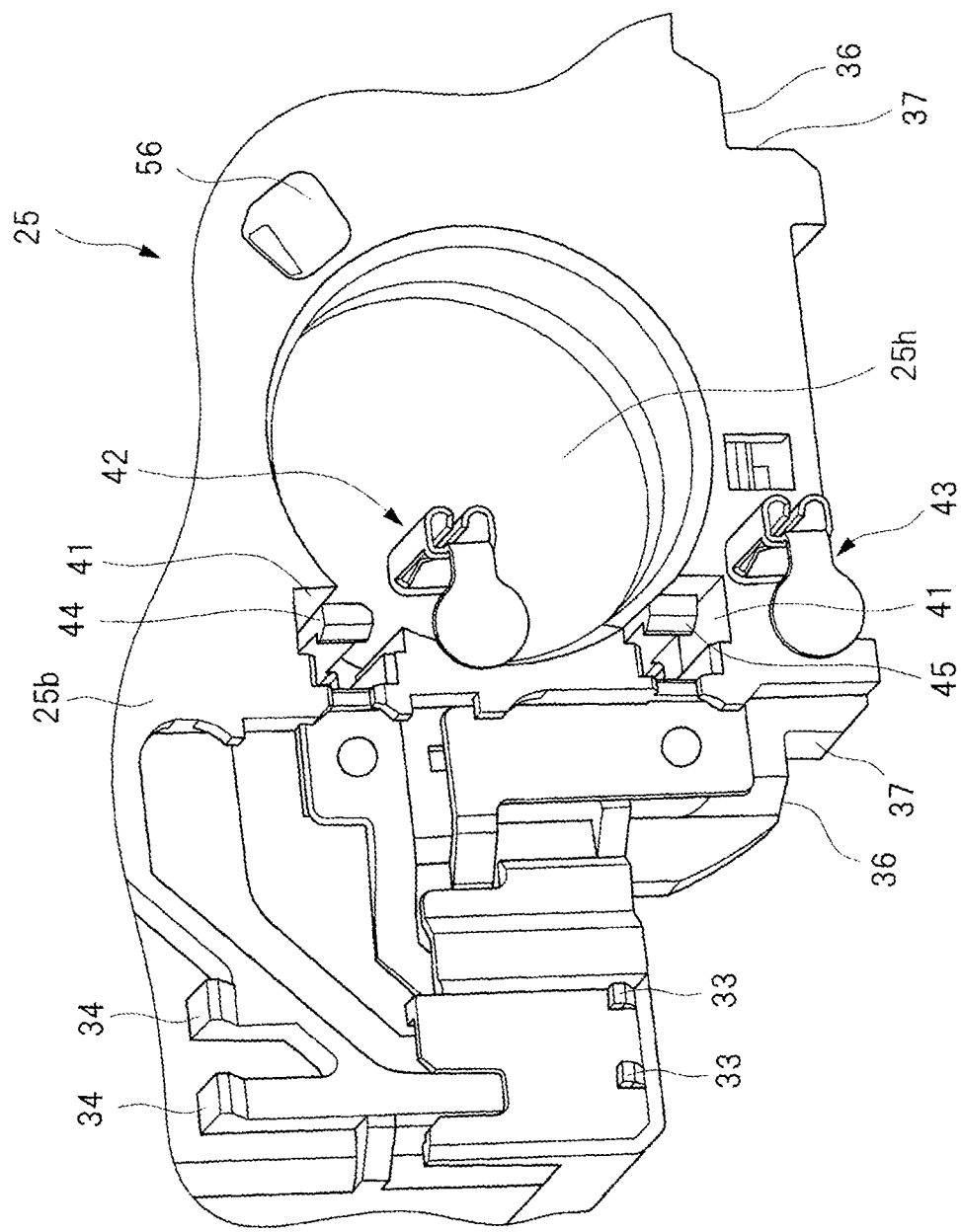
FIG. 17 is a partial perspective view of the connector unit in FIG. 12.
Figure 18:
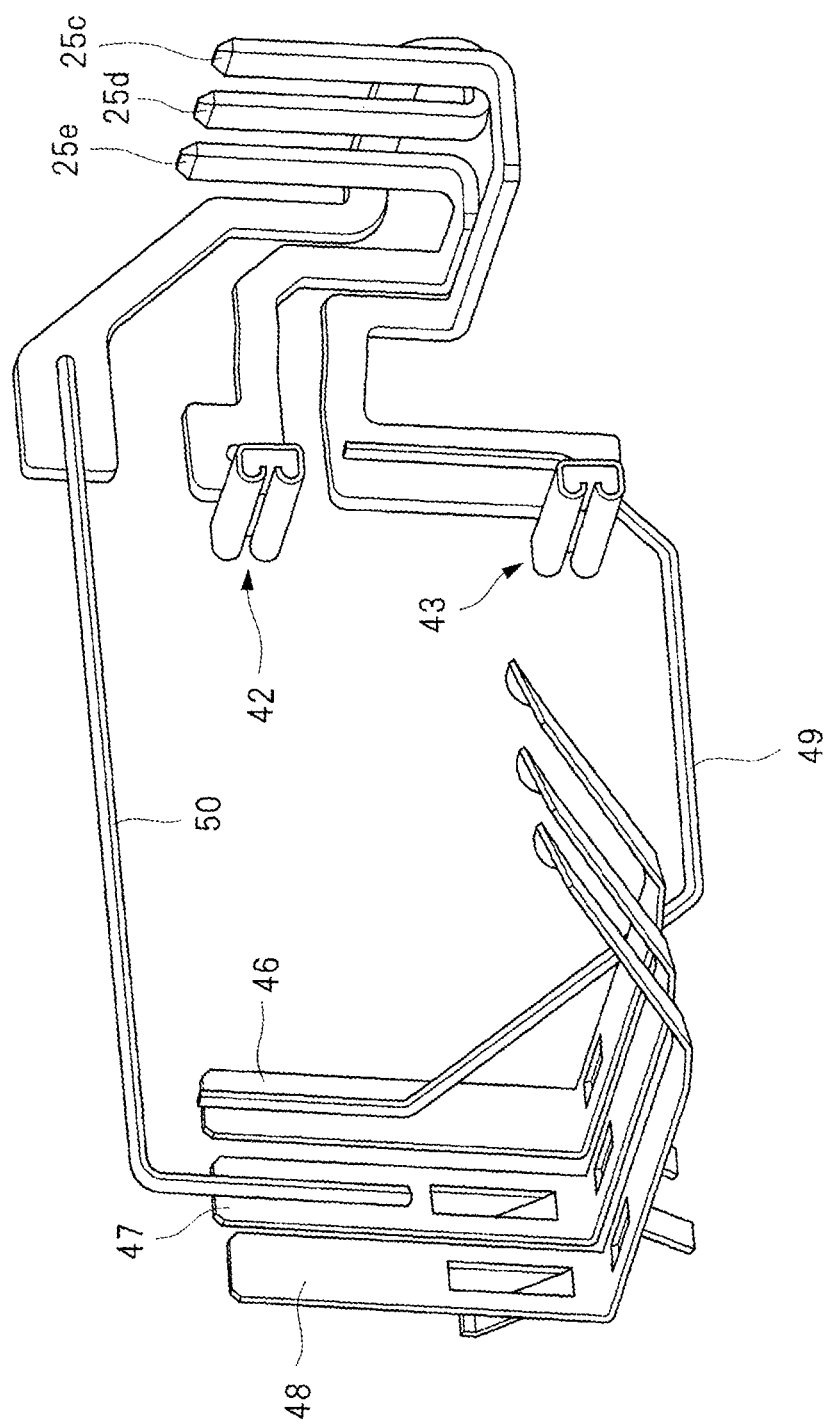
FIG. 18 is a perspective view showing the connection state of terminals installed to the connector unit and the connector unit in FIG. 12.

An electric motor apparatus according to the second embodiment will be described. A schematic arrangement of the electric motor apparatus according to the second embodiment will be described with reference to FIG. 12. Like the electric motor apparatus 10 of the first embodiment, an electric motor apparatus 10 of the second embodiment includes elements such as an electric motor 13, a speed-reduction mechanism 14, a housing 15, a bracket 24, a connector unit 25, and a brush holder 26. Note that FIG. 12 omits an illustration of the bracket 24. When assembling the electric motor apparatus 10 of the second embodiment, the moving directions of these elements are the same as those of the elements in the electric motor apparatus 10 of the first embodiment described with reference to FIG. 2. Therefore, the electric motor apparatus 10 of the second embodiment can obtain the same effects as those obtained by the electric motor apparatus 10 of the first embodiment.

The differences between the arrangement of the electric motor apparatus 10 of the first embodiment and the arrangement of the electric motor apparatus 10 of the second embodiment will be described with reference to FIGS. 12 to 22. The electric motor apparatus 10 of the second embodiment is characterized in a structure in which the connector unit 25 is installed to a first accommodation portion 21a. The housing 15 is provided with holding surfaces 30 which hold the connector unit 25. The holding surfaces 30 are flat surfaces perpendicular to an axis A. The holding surfaces 30 are provided to face the first accommodation portion 21a. In addition, the holding surfaces 30 are provided at two positions to sandwich the axis A. The holding surfaces 30 form a wall surface of the first accommodation portion 21a.

A plurality of projections 31 are provided on a plate portion 25b of the connector unit 25. The plurality of projections 31 are provided on a portion of the plate portion 25b which is located on the holding portion 18 side. A terminal holder 32 is installed under a connector box 25a. The terminal holder 32 is integrally molded of an insulating material, e.g., a resin. The terminal holder 32 holds terminals 25c, 25d, and 25e. The terminals 25c, 25d, and 25e are formed by shaping a conductive metal material into a rod and bending the rod-like metal material. The terminal holder 32 holds one portion of each of the terminals 25c, 25d, and 25e in the longitudinal direction. An end portion of each of the terminals 25c, 25d, and 25e in the longitudinal direction is inserted into the connector box 25a. In addition, projections 33 are provided on the terminal holder 32. The projections 33 protrude toward the holding portion 18. Projections 34 are also provided on the connector box 25a. The projections 34 protrude toward the holding portion 18. When the connector unit 25 is accommodated in the first accommodation portion 21a, the projections 31, 33, and 34 come into contact with the holding surface 30. That is, the movement of the connector unit 25 is restricted in a direction along the axis A with respect to the housing 15.

A plurality of projections 35 are provided on the plate portion 25b of the connector unit 25. The plurality of projections 35 are provided on the opposite side of the plate portion 25b to the side on which the projections 33 and 34 are provided. In addition, a plurality of projections 35 are disposed around a shaft hole 25h. When the connector unit 25 is installed to the first accommodation portion 21a, the plurality of projections 35 come into contact with a support wall 19. The connector unit 25 is positioned to the housing 15 in a direction along the axis A.

In addition, abut portions 36 are provided at two portions of the distal end of the plate portion 25b. In this case, the distal end of the plate portion 25b is the one when the connector unit 25 is inserted into the first accommodation portion 21a. Assume that an opening portion 21c faces upward. In this case, the abut portions 36 at the two portions are formed in a horizontal plane. In addition, other abut portions 37 are provided continuously with the abut portions 36 at the two portions. Assume that an opening portion 21c faces upward. In this case, the abut portions 37 at the two portions are formed in a horizontal plane. The abut portions 36 and the abut portions 37 are continuously formed in an L shape.

On the other hand, projection portions 38 are provided at two portions of the housing 15. The projection portions 38 extend towards the bottom portion of the first accommodation portion 21a from the inner surface of the shaft hole 25h in a direction along the axis A. That is, when the opening portion 21c faces upward, the projection portions 38 are disposed below the axis A. In addition, the projection portions 38 at the two portions are disposed at different positions in the circumferential direction centered on the axis A. The projection portions 38 have stopper surfaces 38a and restricting surfaces 38b. Assume that the opening portion 21c faces upward, the stopper surfaces 38a are in an almost horizontal position, and the restricting surfaces 38b are in an almost vertical position. In addition, the restricting surfaces 38b face each other.

When the connector unit 25 is inserted into the first accommodation portion 21a, the abut portions 36 at the tow portions separately come into contact with the stopper surfaces 38a at the two portions, and the connector unit 25 stops. That is, the connector unit 25 is completely inserted into the first accommodation portion 21a. In addition, the abut portions 37 at the two portions separately come into contact with the restricting surfaces 38b at the two portions to restrict the connector unit 25 from moving in the horizontal direction with respect to the housing 15. In addition, projection portions 53 are provided on the inner surface of the shaft hole 25h. The projection portions 53 are provided at two different portions of the shaft hole 25h in the circumferential direction. The projection portions 53 are provided at positions different from those of the projection portions 38.

In addition, three projections 39 are provided on the bottom surface of the terminal holder 32. The three projections 39 are provided on the distal end when the connector unit 25 is inserted into the first accommodation portion 21a. From a planar view of the terminal holder 32, the three projections 39 are disposed immediately below the terminals 25c, 25d, and 25e. While the connector unit 25 is completely inserted into the first accommodation portion 21a, when an external connector is inserted into the connector box 25a, the three terminals of the external connector are independently connected to the three terminals 25c, 25d, and 25e, respectively. When the external connector is inserted into the connector box 25a, part of the force applied to the connector unit 25 is transmitted to the three terminals 25c, 25d, and 25e. The housing 15 receives the force transmitted to the three terminals 25c, 25d, and 25e through the three projections 39 of the terminal holder 32. This can suppress the positions of the three terminals 25c, 25d, and 25e from shifting with respect to the three terminals of the external connector in the inserting direction of the external connector.

In addition, projections 40 are provided at two portions of the upper surface of the plate portion 25b. When the connector unit 25 is inserted into the first accommodation portion 21a and the bracket 24 is installed to the housing 15, the projections 40 at the two portions come into contact with the inner surface of the bracket 24. Therefore, the connector unit 25 is positioned in the vertical direction with respect to the housing 15. In addition, a positioning hole 56 penetrating through the plate portion 25b is provided.

In addition, terminal installation holes 41 are provided at two portions of the plate portion 25b of the connector unit 25. Terminals 42 and 43 are independently inserted and fixed in the terminal installation holes 41 at the two portions. In addition, locking pawls 44 and 45 are separately provided in the terminal installation holes 41 at the two portions. The locking pawl 44 locks on the terminal 42 to fix the terminal 42 so as not to make it come off the plate portion 25b. That is, the locking pawl 44 is a mechanism for preventing the terminal 42 from coming off the terminal installation hole 41. In addition, the locking pawl 45 locks on the terminal 43 to fix the terminal 43 so as not to make it come off the plate portion 25b. That is, the locking pawl 45 is a mechanism for preventing the terminal 43 from coming off the terminal installation hole 41. In addition, the terminal 42 is connected to the terminal 25e, and the terminal 43 is connected to the terminal 25c.

In the assembly process of the connector unit 25, the terminal 42 is inserted into the terminal installation hole 41. The locking pawl 44 then elastically deforms and locks on the terminal 42 to fix the terminal 42. In addition, when the terminal 43 is inserted into the terminal installation hole 41, the locking pawl 45 elastically deforms and then locks on the terminal 43 to fix the terminal 43. As described above, the connector unit 25 has a structure in which the locking pawls 44 and 45 elastically deform to fix the terminals 42 and 43 to the plate portion 25b, that is, a snap-fit structure. In addition, the terminals 42 and 43 can be reliably fixed to the plate portion 25b. This can prevent a failure to install the terminals 42 and 43 to the plate portion 25b. Furthermore, in the connector unit 25, the terminal 42 is reliably in contact with the terminal 25e, and the terminal 43 is reliably in contact with the terminal 25c.

In addition, three contact plates 46, 47, and 48 are installed to the plate portion 25b of the connector unit 25. The contact plates 46, 47, and 48 are integrally molded using a conductive metal material. The contact plate 46 is connected to the terminal 25c via a conductive wire 49. The contact plate 47 is connected to the terminal 25d via a conductive wire 50. The contact plate 48 is in contact with the housing 15. The contact plates 46, 47, and 48 form a mechanism for detecting the rotational phase (rotational position) of a worm wheel 14a.

The contact plate 47 has a contact piece 47a. The contact piece 47a is formed by cutting and erecting a portion of the contact plate 47. The contact piece 47a is erected toward the holding portion 18. Before the connector unit 25 is installed to the first accommodation portion 21a, the contact piece 47a protrudes from the surface of the plate portion 25b. The surface of the plate portion 25b is the one in the vertical direction in the accompanying drawings. While the connector unit 25 is installed to the first accommodation portion 21a, the contact piece 47a is in contact with the housing 15. That is, electric current can flow between the contact plate 47 and the housing 15.

Figure 19:
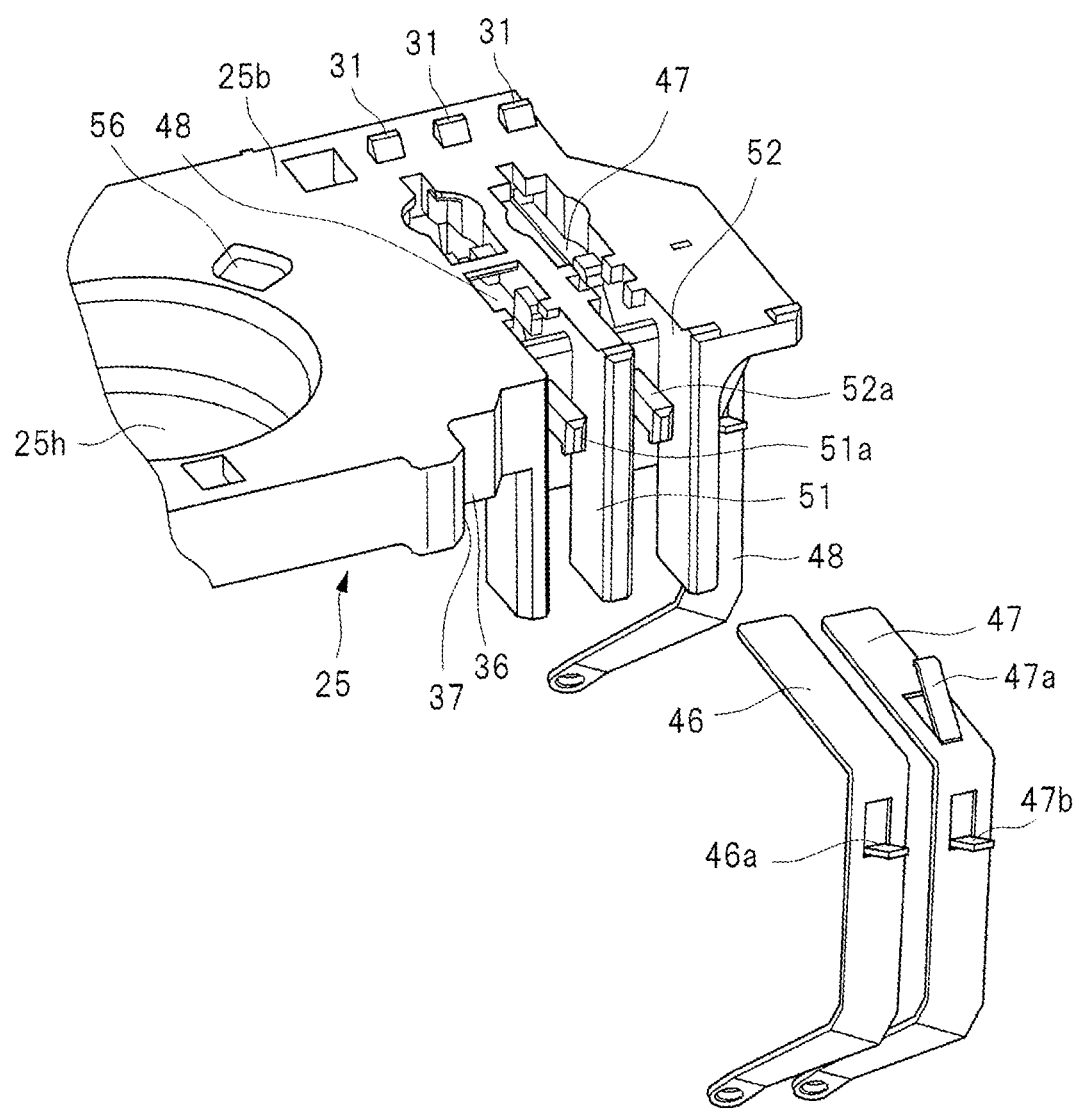
FIG. 19 is a partial perspective view of the connector unit in FIG. 12.

A structure configured to install the contact plates 46 and 47 to the plate portion 25b will be described next. As shown in FIG. 19, the plate portion 25b is provided with concave portions 51 and 52. The concave portion 51 is provided with a locking pawl 51a. In addition, the concave portion 52 is provided with a locking pawl 52a. On the other hand, the contact plate 46 is provided with a locking pawl 46a. The contact plate 47 is provided with a locking pawl 47b. When the contact plate 46 is inserted into the concave portion 51 from one direction, the locking pawl 46a locks on the locking pawl 51a. That is, the contact plate 46 can be fixed to the plate portion 25b. When the contact plate 47 is inserted into the concave portion 52 from one direction, the contact piece 47a locks on the locking pawl 52a. That is, the contact plate 47 can be fixed to the plate portion 25b.

Figure 20:
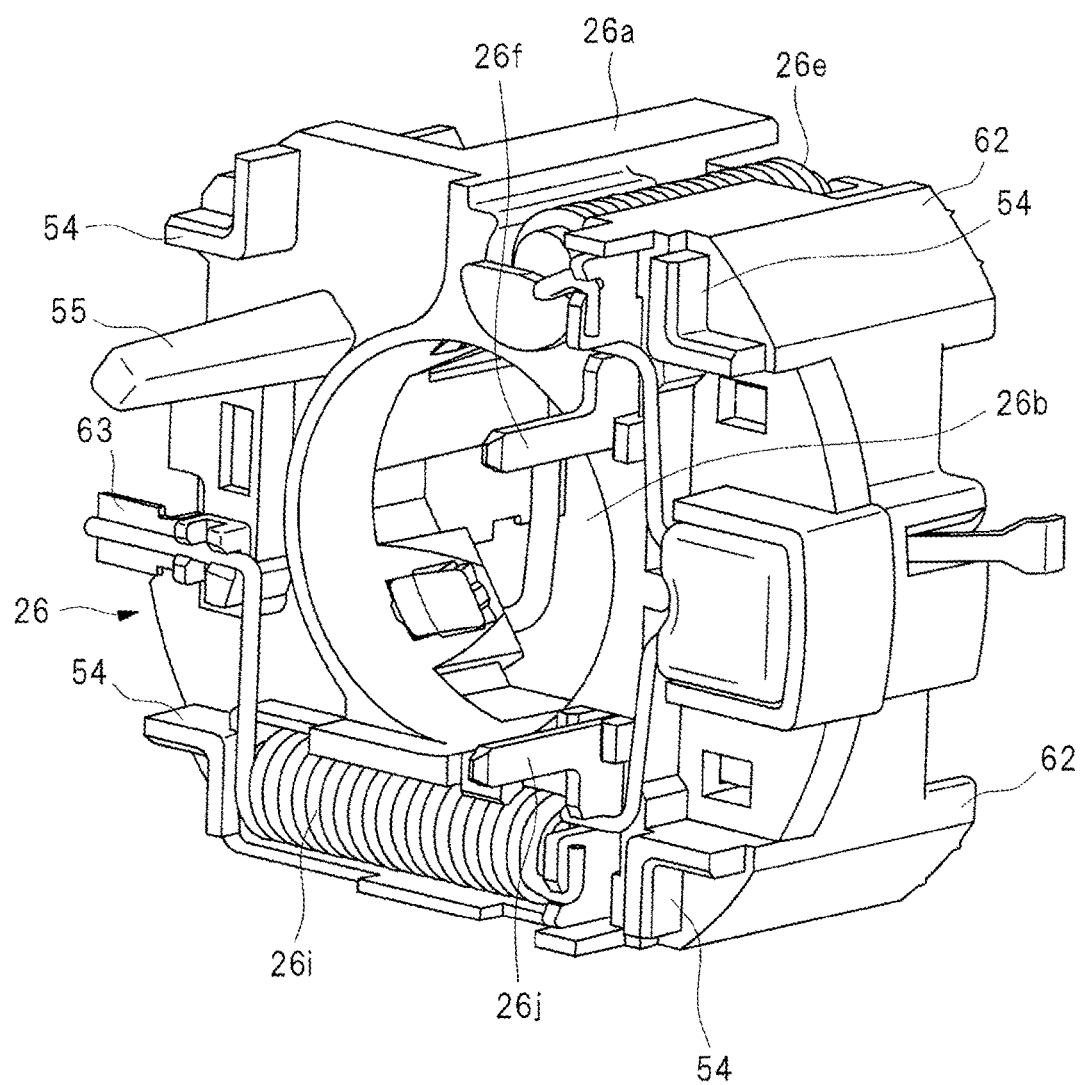
FIG. 20 is a perspective view of a brush unit installed to the connector unit in FIG. 12.
Figure 21:
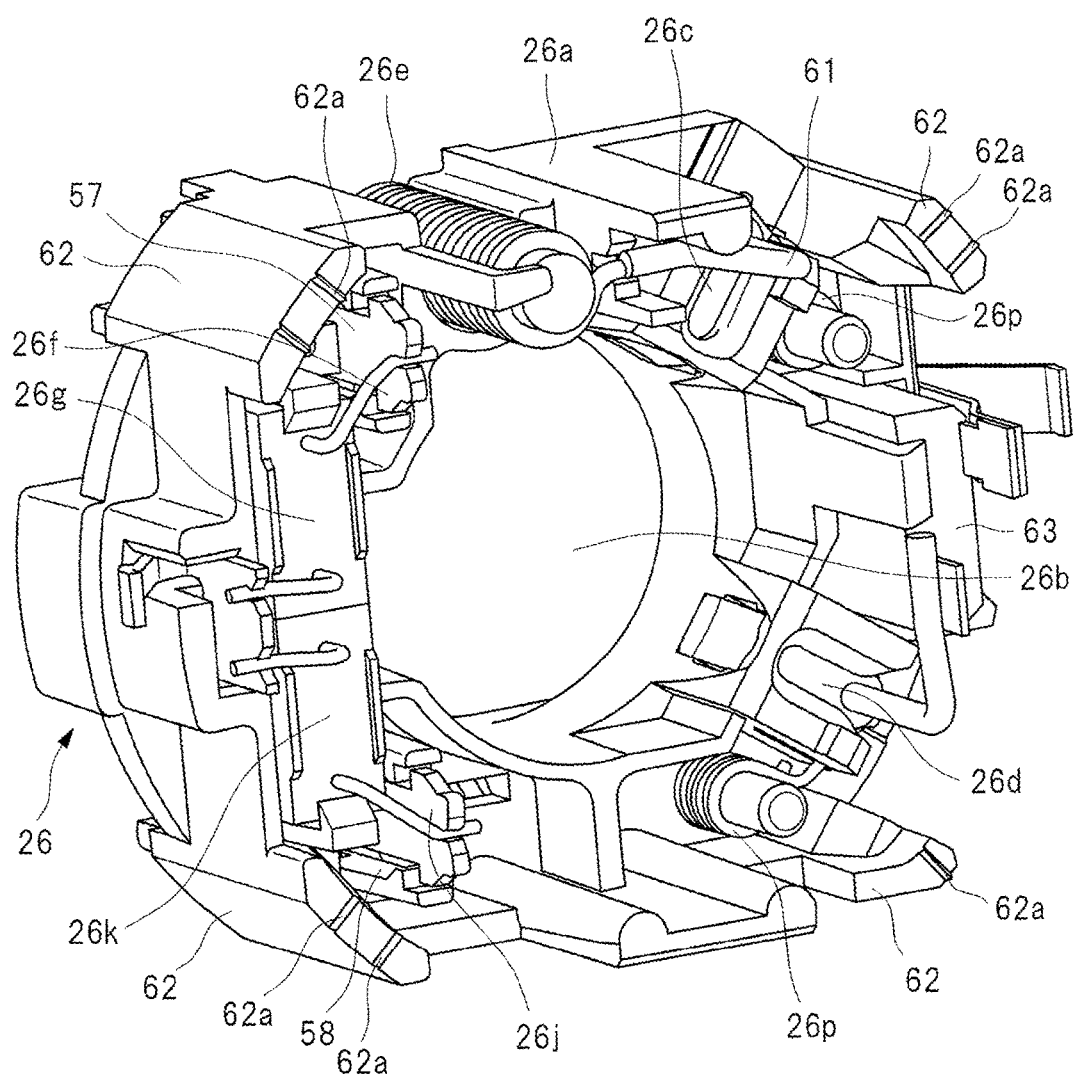
FIG. 21 is a perspective view of the brush unit installed to the connector unit in FIG. 12.
Figure 22:
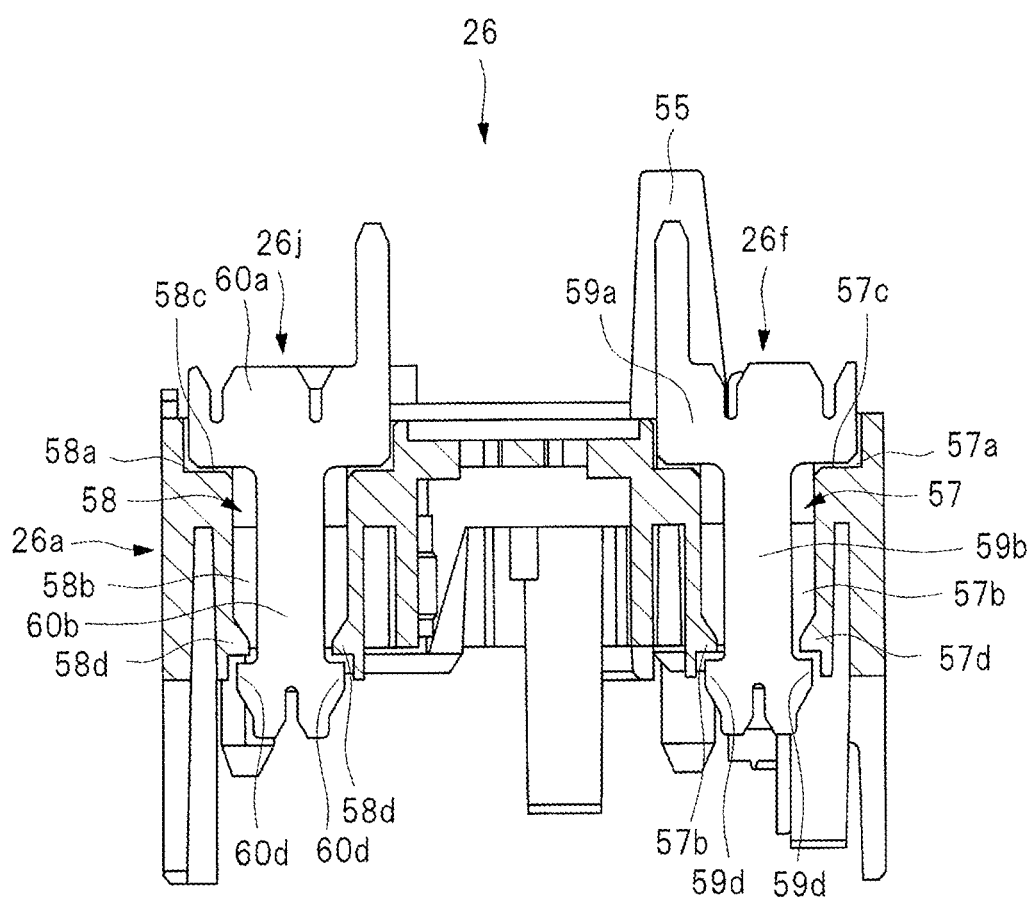
FIG. 22 is a cross-sectional view of the brush unit in FIG. 21 and FIG. 22.

The arrangement of the brush holder 26 in the second embodiment will be described next with reference to FIGS. 20 to 22. Four locking pawls 54 are provided on the stay 26a at portions near the connector unit 25. The locking pawls 54 are provided at different positions in the circumferential direction centered on the axis A. Each locking pawl 54 has an L shape within a plane perpendicular to the axis A. A positioning pin 55 is provided on the stay 26a at a position on the connector unit 25 side. While the brush holder 26 is being installed to a holding hole 18a, the positioning pin 55 is inserted in the positioning hole 56. In addition, the stay 26a is in contact with the projection portions 53. In addition, the two locking pawls 54 come into contact with the projection portions 53, and the two locking pawls 54 come into contact with the projection portions 38, thereby positioning the brush holder 26 with respect to the housing 15 in the circumferential direction centered on the axis A.

Here, a process of installing the brush holder 26 to the housing 15 in which the connector unit 25 is installed will be described below. First, a shaft hole 26b of a stay 26a is placed coaxially with the shaft hole 25h of the connector unit 25, and the positioning pin 55 and the positioning hole 56 are placed at the same position in the circumferential direction. The brush holder 26 is then inserted into the holding hole 18a. Subsequently, as the positioning pin 55 is inserted into the positioning hole 56, the stay 26a comes into contact with the projection portions 53 to stop brush holder 26, installing the brush holder 26 to the housing 15. As described above, the second embodiment is configured such that the locking pawls 54 provided on the stay 26a come into contact with the projection portions 53 and 38 provided on the inner circumferential surface of the holding hole 18a of the housing 15 to position the brush holder 26 to the housing 15 in the circumferential direction centered on the axis A. Therefore, the end face of the holding portion 18 can be formed into a flat shape.

Brushes 26c and 26d are installed to the stay 26a. A choke coil 26e is installed to the stay 26a. In the case shown in FIG. 21, the shaft center (not shown) of the coil portion of the choke coil 26e is parallel to the axis A. One end of the choke coil 26e is connected to the brush 26c via a conductive wire 61. Since the shaft center of the coil portion of the choke coil 26e is parallel to the axis A, the conductive wire 61 is connected to one end of the choke coil 26e by extending one end of the choke coil 26e in the radial direction of the coil portion. In addition, one end of a choke coil 26i is connected to the brush 26d via a connection member 63. In addition, terminals 26f and 26j are installed to the brush holder 26. The terminals 26f and 26j are elongated elements extended in a direction along the axis A. The other end of the choke coil 26*e* is connected to the terminal 26*f*. The other end of the choke coil 26*i* is connected to the terminal 26*j*.

Installation holes 57 and 58 extend through the stay 26*a* in a direction along the axis A. The terminal 26*f* is installed to the installation hole 57, and the terminal 26*j* is installed to the installation hole 58. FIG. 21 is a cross-sectional view of the stay 26*a* in a plane including both the installation holes 57 and 58. The shape of the installation hole 58 in a plane including both the installation holes 57 and 58 is explained. The installation hole 57 has a wide portion 57*a* and a narrow portion 57*b*. The wide portion 57*a* is wider than the narrow portion 57*b*. A step portion 57*c* is continuously formed between the wide portion 57*a* and the narrow portion 57*b*. Two projections 57*d* are provided on the narrow portion 57*b*. The two projections 57*d* are provided on the two sides of the installation hole 57 in the widthwise direction. The terminal 26*f* has a wide portion 59*a* and a narrow portion 59*b*. The wide portion 59*a* is wider than the narrow portion 59*b*. In addition, two projections 59*d* protrude from the narrow portion 59*b* in the widthwise direction.

On the other hand, the installation hole 58 has a wide portion 58*a* and a narrow portion 58*b*. The wide portion 58*a* is wider than the narrow portion 58*b*. A step portion 58*c* is continuously formed between the wide portion 58*a* and the narrow portion 58*b*. Two projections 58*d* are provided on the narrow portion 58*b*. The two projections 58*d* are provided on the two sides of the installation hole 58 in the widthwise direction. The terminal 26*j* has a wide portion 60*a* and a narrow portion 60*b*. The wide portion 60*a* is wider than the narrow portion 60*b*. Two projections 60*d* protrude from the narrow portion 60*b* in the widthwise direction.

In the assembly process of the brush holder 26, the terminal 26*f* is inserted into the installation hole 57, and the terminal 26*j* is inserted into the installation hole 58. First, the terminal 26*f* is inserted into the installation hole 57, with the narrow portion 59*b* serving as a distal end in the inserting direction. In addition, the narrow portion 59*b* of the terminal 26*f* passes through the wide portion 57*a* first, and then enters the narrow portion 57*b*. When the projections 59*d* come into contact with the projections 57*d*, part of the stay 26*a* elastically deforms. More specifically, part of the stay 26*a* elastically deforms so as to increase the distance between the two projections 57*d*. When the terminal 26*f* comes into contact with the step portion 57*c* of the wide portion 59*a*, the installation of the terminal 26*f* to the stay 26*a* is complete. When the terminal 26*f* is installed to the stay 26*a*, even if force is applied to the terminal 26*f* in a direction to make it come off the installation hole 57, the terminal 26*f* is prevented from coming off the installation hole 57 by making the projections 59*d* come into contact with the projections 57*d*.

On the other hand, the terminal 26*j* is inserted into the installation hole 58, with the narrow portion 60*b* serving as a distal end in the inserting direction. In addition, the narrow portion 60*b* of the terminal 26*j* passes through the wide portion 58*a* first, and then enters the narrow portion 58*b*. When the projections 58*d* come into contact with the projections 60*d*, part of the stay 26*a* elastically deforms. More specifically, part of the stay 26*a* elastically deforms so as to increase the distance between the two projections 58*d*. When the terminal 26*j* comes into contact with the step portion 58*c* of the wide portion 60*a*, the installation of the terminal 26*j* to the stay 26*a* is complete. When the terminal 26*j* is installed to the stay 26*a*, even if force is applied to the terminal 26*j* in a direction to make it come off the installation hole 58, the terminal 26*j* is prevented from coming off the installation hole 58 by making the projections 60*d* come into contact with the projections 58*d*.

As described above, the brush holder 26 has a structure in which part of the stay 26*a* elastically deforms, and the terminals 26*f* and 26*j* are installed to the stay 26*a* in the process of assembling the terminals 26*f* and 26*j* on the stay 26*a*, that is, a snap-fit structure. For this reason, in the assembly process of the brush holder 26, it is possible to manually assemble the brush holder 26 without using any press fitting machine.

In addition, the dimensions of the terminal 26*f* and stay 26*a* are designed in advance so as to form a gap between the wide portion 59*a* of the terminal 26*f* and the inner surface of the wide portion 57*a* of the installation hole 57 in the widthwise direction of the terminal 26*f*. In addition, the dimensions of the terminal 26*j* and stay 26*a* are designed in advance so as to form a gap between the wide portion 60*a* of the terminal 26*j* and the inner surface of the wide portion 58*a* of the installation hole 58 in the widthwise direction of the terminal 26*j*. Furthermore, the dimensions of the terminals 26*f* and 26*j* and stay 26*a* are designed in advance so as to form gaps between the stay 26*a* and the terminals 26*f* and 26*j* in the thickness direction of the terminals 26*f* and 26*j*. It is therefore possible to prevent twisting between the terminals 26*f* and 26*j* and the stay 26*a* even in the presence of variations in working accuracy of the terminals 26*f* and 26*j*, variations in working accuracy of the stay 26*a*, and variations in assembly accuracy of the terminals 26*f* and 26*j* on the stay 26*a*. This improves the productivity of the brush holder 26.

A plurality of contact pieces 62 are provided on the outer circumference of the stay 26*a* of the brush holder 26. Referring to FIG. 21, the four contact pieces 62 are provided. The plurality of contact pieces 62 protrude in a direction to approach the yoke 16*a* in a direction along the axis A. While the brush holder 26 is inserted and positioned in the holding hole 18*a*, the end faces of the plurality of contact pieces 62 are located on the same plane as that of the end face of the holding portion 18. Projections 62*a* are respectively provided on the end faces of the plurality of contact pieces 62. While a yoke 16*a* is not fixed to the housing 15, the projections 62*a* protrude from the end faces of the contact pieces 62 in a direction along the axis A. In the process of fixing the yoke 16*a* to the housing 15, first, the projections 62*a* come into contact with a flange portion 16*e* of the yoke 16*a*, and the plurality of contact pieces 62 do not come into contact with flange portion 16*e*. When a screw member 16*g* is fastened, the flange portion 16*e* presses the projections 62*a* to make them elastically deform. The end faces of the plurality of contact pieces 62 come into contact with the flange portion 16*e*, thereby fixing the yoke 16*a* to the housing 15.

(Third Embodiment)

Figure 23:
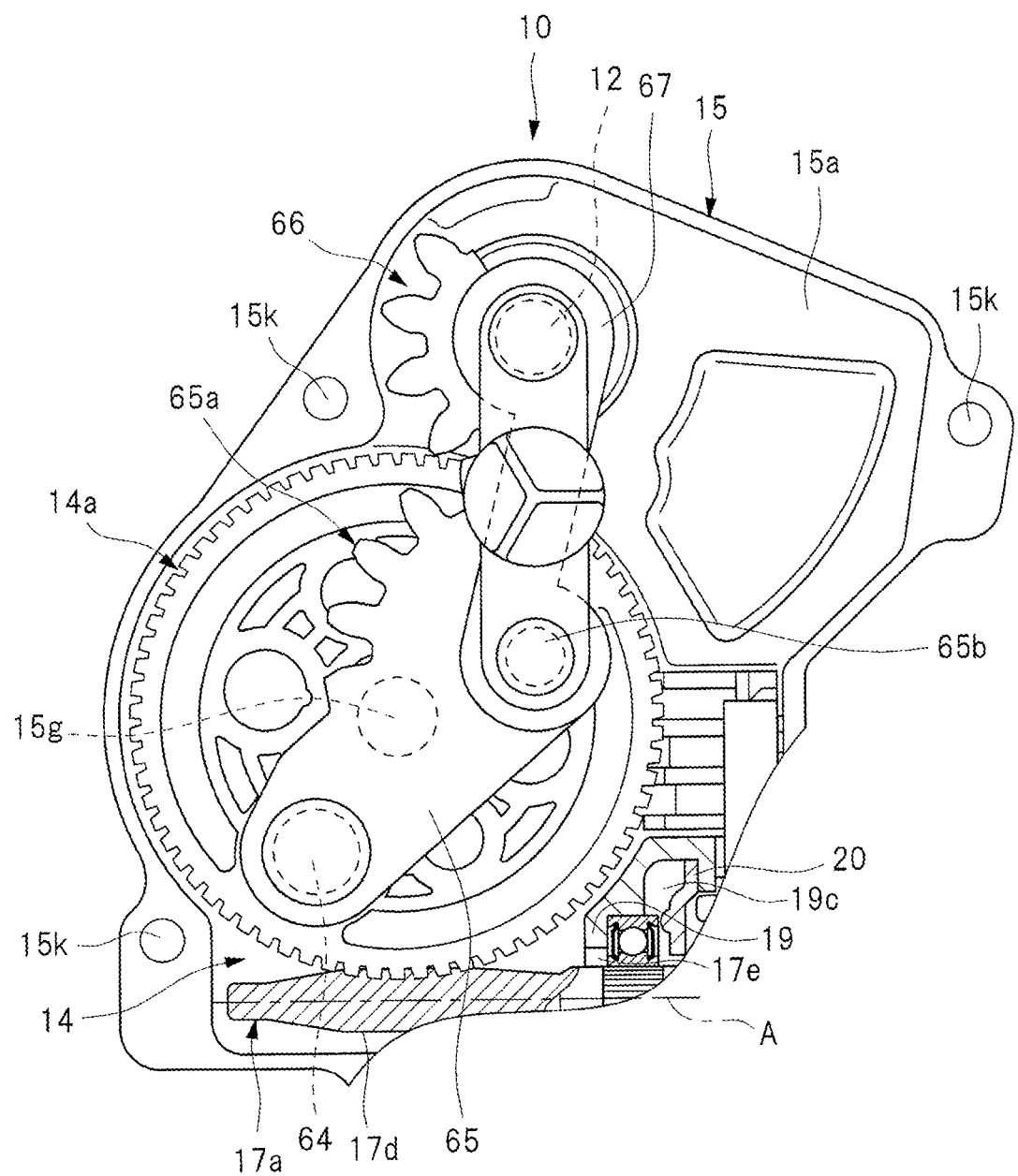
FIG. 23 is a partial plan view showing another embodiment of the electric motor apparatus of the present invention.

The arrangement of an electric motor apparatus 10 according to the third embodiment will be described with reference to FIG. 23. In the electric motor apparatus 10 of the third embodiment, a pivot shaft 12 is disposed in the disposition space of a speed-reduction mechanism 14 in a direction along an axis A. More specifically, a worm wheel 14*a* is disposed between the pivot shaft 12 and an armature shaft 17*a* in a direction at a right angle to the axis A. A pin 64 is installed at a position eccentric to a support shaft 15*g* in the worm wheel 14*a*. A connection arm 65 is rotatably installed to the pin 64. The connection arm 65 is provided with a sector gear 65*a*. The 65 is also provided with a pin 65*b*.

On the other hand, a pinion gear 66 is provided, which rotates together with the pivot shaft 12 about the pivot shaft 12. The pinion gear 66 meshes with the sector gear 65a. A link 67 is also provided to couple the pivot shaft 12 to the pin 65b. The link 67 is rotatably coupled to the pivot shaft 12 and the pin 65b. That is, the link 67 is an element for holding the center distance between the pinion gear 66 and the sector gear 65a constant.

In the electric motor apparatus 10 of the third embodiment, the motive power of the electric motor rotates an armature shaft 17a forward and reversely within a predetermined angle range. When the motive power of the armature shaft 17a is transmitted to the worm wheel 14a to rotate the worm wheel 14a forward and reverse, the motive power of the worm wheel 14a is transmitted to the pivot shaft 12 via the sector gear 65a and the pinion gear 66. Therefore, the pivot shaft 12 rotates forward and reverse in a predetermined angle range. In the electric motor apparatus 10 of the third embodiment, the pivot shaft 12 is disposed in the disposition space of the speed-reduction mechanism 14 in a direction along the axis A. This can reduce the occupied space in a direction along the axis A of the electric motor apparatus 10. Note that the remaining arrangement of the electric motor apparatus 10 of the third embodiment is the same as that of the electric motor apparatus 10 of the first embodiment and that of the electric motor apparatus 10 of the second embodiment.

In addition, the above-described embodiments have exemplified the structure in which the worm 17d is integrally formed with the armature shaft 17a. However, the present invention is not limited to this. The worm shaft on which the worm is formed and the armature shaft may be formed as discrete components. That is, the armature shaft and the worm shaft formed as discrete components may be coupled to each other in the housing.

In addition, the above-described embodiments are configured to accommodate almost the entire brush holder 26 in the housing 15. However, the present invention is not limited to this. The brush holder 26 may be accommodated in the housing 15 and the yoke 16a.

In addition, the electric motor apparatus of the present invention can also be used as a motive power source for a power slide door unit. This power slide door unit is a mechanism which converts the rotating motion of the electric motor installed to a door into the opening/closing operation (linear motion) of the door (actuation member). Since this power slide door unit is known as disclosed in Japanese Patent Laid-Open Nos. 2006-333691 and 2009-24387, a description of a specific arrangement will be omitted. In addition, in the electric motor apparatus of the present invention, the operation of an actuation member to which the motive power of the electric motor is transmitted may be rotating motion, swinging motion, linear motion, reciprocating motion, or the like.

The motive-power transmission mechanism in the present invention is a mechanism which transmits the motive power of the electric motor to an actuation member. The motive-power transmission mechanism includes rotating elements such as gears, pulleys, belts, rollers, and rotating shafts. In addition, the speed-reduction mechanism in the present invention includes, in addition to a combination of a worm and a worm wheel, a combination of spur gears, a combination of helical gears, a combination of a pinion gear and a ring gear, and a combination of a pair of pulleys and a belt.

In addition, the above-described embodiments have exemplified the process of assembling the electric motor apparatus 10 while supporting the housing 15 with the opening portion 15f facing upward. However, when assembling the electric motor apparatus 10, it is possible to perform the first to fifth steps described above while supporting the housing 15 by using an automated machine, with the opening portion 15f facing upward. In this case, the up/down direction (vertical direction) and the horizontal direction described in each step are respectively read as the horizontal direction and the up/down direction (vertical direction). However, the principle of assembling the respective elements upon moving them from two orthogonal directions with respect to the housing 15 remains the same.

The present invention can be used in an electric motor apparatus unitized by installing, to a housing, an electric motor which is driven by being supplied with power and a motive-power transmission mechanism coupled to the electric motor.

While the present invention has been illustrated and described with respect to a particular embodiment thereof, it should be appreciated by those of ordinary skill in the art that various modifications to this invention may be made without departing from the spirit and scope of the present.

What is claimed is:

1. An electric motor apparatus comprising an electric motor which is driven by electric power supplied thereto, a motive-power transmission mechanism to which motive power is transmitted from the electric motor, and a housing in which the motive-power transmission mechanism and part of the electric motor are accommodated, the electric motor including an armature shaft which is partially accommodated in the housing and rotatable about an axis thereof, a coil installed to the armature shaft, a commutator which is installed to the armature shaft and switches a current flowing in the coil, and a cylindrical yoke which rotatably supports the armature shaft, and a brush holder holding a power supply brush which comes into contact with the commutator and a connector unit which is conductively connected to the brush and to which an external connector is detachably connected, wherein the housing includes:

a concave portion having a first opening portion opened in a plane parallel to the axis of the armature shaft;

a holding portion formed with a holding hole extending in a direction along the axis; and an accommodation chamber communicating with the holding hole, the connector unit is installed to the concave portion through the first opening portion, and the brush holder is installed to the holding hole through the second opening portion so that the brush and the connector unit are connected to be power-feedable to each other, the connector unit has a shaft hole in which the armature shaft is partially inserted, the brush holder has a shaft hole in which the armature shaft is partially inserted, the shaft hole of the connector unit installed to the concave portion is axially aligned with the shaft hole of the brush holder installed to the holding hole, the armature shaft extends in the accommodation chamber through the shaft hole of the brush holder and the shaft hole of the connector unit, the motive-power transmission mechanism is accommodated in the accommodation chamber through the third opening portion, and the yoke is fixed to the housing so as to cover the second opening portion.

2. The electric motor apparatus according to claim 1,
wherein the motive-power transmission mechanism includes a worm provided on the armature shaft and a worm wheel which meshes with the worm and is configured to rotate about a support shaft, and the motive-power transmission mechanism is a speed-reduction mechanism configured such that, upon transmitting motive power from the armature shaft to the worm wheel, the number of revolutions of the worm wheel becomes smaller than the number of revolutions of the armature shaft.

3. The electric motor apparatus according to claim 1,
wherein the brush holder is provided with a first terminal conductively connected to the brush, the connector unit is provided with a second terminal connected to the external connector, and the first terminal and the second terminal are connected to each other inside the holding hole when the brush holder is installed to the holding hole with the connector unit installed to the concave portion.

4. The electric motor apparatus according to claim 2,
wherein the concave portion is provided so as to be closer to the yoke than the support shaft in a direction along the axis.

5. The electric motor apparatus according to claim 1,
wherein the brush holder held in the holding hole is sandwiched and fixed between the housing and the yoke, a lid member sealing the first opening portion is provided, and the connector unit installed to the concave portion is sandwiched and fixed between the housing and the lid member.

6. A method of assembling an electric motor apparatus including preparing an electric motor that includes an armature shaft around which a coil is wound and to which a commutator for switching a current flowing in the coil is installed and rotatable about an axis thereof; and a cylindrical yoke,
preparing a brush holder to which a brush for energizing the commutator is installed, a connector unit which is connected to the brush to be power-feedable to the brush and to which an external connector is detachably connected, a motive-power transmission mechanism to which motive power of the armature shaft is transmitted, and a housing including a concave portion having a first opening portion, a holding portion formed with a holding hole extending in a direction along the armature shaft, and an accommodation chamber communicating with the holding hole, wherein the connector unit has a shaft hole in which the armature shaft is partially inserted, the brush holder has a shaft hole in which the armature shaft is partially inserted,
accommodating the motive-power transmission mechanism inside the housing by inserting part of the armature shaft into the housing while the connector unit and the brush holder are positioned with respect to the housing, and fixing the yoke to the housing while a portion of the armature shaft disposed outside the housing and the coil inside the yoke are being accommodated inside the yoke,
wherein the method comprises:
a first step of installing the connector unit in the concave portion through the first opening portion by moving the connector unit along a first direction;
a second step of installing the brush holder in the holding hole through a second opening portion by moving the brush holder along a second direction perpendicular to the first direction so that the connector unit and the brush holder are connected to each other, the shaft hole of the connector unit installed to the concave portion is axially aligned with the shaft hole of the brush holder installed to the holding hole;
a third step of disposing part of the armature shaft in the accommodation chamber through the holding hole and bringing the commutator into contact with the brush by moving the armature shaft along the second direction and partially inserting the armature in the accommodation chamber through the shaft hole of the brush holder and the shaft hole of the connector unit;
a fourth step of disposing the motive-power transmission mechanism in the accommodation chamber through a third opening portion by moving the motive-power transmission mechanism along the first direction; and
a fifth step of fixing the yoke to the housing by moving the yoke along the second direction so as to cover the second opening portion.

* * * * *